(12) United States Patent
Mondini

(10) Patent No.: US 10,926,899 B2
(45) Date of Patent: Feb. 23, 2021

(54) MACHINE FOR SEALING CONTAINERS AND METHOD FOR SEALING A PLURALITY OF CONTAINERS

(71) Applicant: IMMOBILIARE MONDINI S.P.A., Brescia (IT)

(72) Inventor: Giovanni Mondini, Cologne (IT)

(73) Assignee: MONDINI S.R.L., Brescia (IT)

( * ) Notice: Subject to any disclaimer, the term of this patent is extended or adjusted under 35 U.S.C. 154(b) by 401 days.

(21) Appl. No.: 15/652,468

(22) Filed: Jul. 18, 2017

(65) Prior Publication Data

US 2018/0022485 A1 Jan. 25, 2018

(30) Foreign Application Priority Data

Jul. 21, 2016 (IT) ........................... UA2016A005395

(51) Int. Cl.
*B65B 7/16* (2006.01)
*B29C 65/00* (2006.01)
(Continued)

(52) U.S. Cl.
CPC .............. *B65B 7/164* (2013.01); *B29C 65/18* (2013.01); *B29C 65/7451* (2013.01);
(Continued)

(58) Field of Classification Search
CPC ......... B65B 7/164; B65B 51/14; B65B 61/06; B65B 31/028; B29C 66/24244;
(Continued)

(56) References Cited

U.S. PATENT DOCUMENTS 1,261,310 A * 4/1918 Smith ...................... B26D 1/16
83/277
3,416,292 A 12/1968 Weber
(Continued)

FOREIGN PATENT DOCUMENTS

CA 1280684 C 2/1991
EP 0334266 A1 9/1989
(Continued)

*Primary Examiner* — Hemant Desai
*Assistant Examiner* — Christopher Robin Kim
(74) *Attorney, Agent, or Firm* — Pearne & Gordon LLP

(57) ABSTRACT

This disclosure relates to a machine (1) for sealing containers (91) using a film (95). The machine (1) comprises a first jaw member (21), comprising a plurality of seats (20) for respective containers (91) to be sealed, and a second jaw member (22), facing towards the seats (20) of the first jaw member (21). The first jaw member (21) and the second jaw member (22) are movable one relative to the other between a first condition, in which the two jaw members (21, 22) are separated from each other by an interspace (23) suitable for receiving a film (95), and a second condition, in which the two jaw members (21, 22) are clamped together and, in use, press the film (95) against the containers (91) in the seats (20). The seats (20) are side by side one after another along a longitudinal line (200) extending between a first side (231) and a second side (232) of the interspace (23). The machine also comprises a film feeding device (3) facing towards the first side (231) of the interspace (23), and a positioning apparatus for positioning the film (95) in the interspace (23). The film (95) positioning apparatus comprises a first gripping device (4), which is positioned at the second side (232) of the interspace (23), and a second gripping device (5), that is movable parallel to the longitudinal line (200) between a first position close to the film feeding device (3) and a second position close to the first gripping device (4). The second gripping device (5) in the first position is capable of (Continued)

gripping one edge of the film (95) which projects from the film feeding device (3) and is capable of pulling the gripped film (95) with a movement towards the second position, thereby positioning the film (95) in the interspace (23) at said plurality of seats (20). The first gripping device (4) is capable of gripping the edge of the film (95) positioned by the second gripping device (5). This disclosure relates also to a method for sealing a plurality of containers (91).

18 Claims, 22 Drawing Sheets

(51) Int. Cl.
*B29C 65/78* (2006.01)
*B65B 51/14* (2006.01)
*B29C 65/18* (2006.01)
*B29C 65/74* (2006.01)
*B65B 61/06* (2006.01)
*B29L 31/00* (2006.01)
*B65B 31/02* (2006.01)

(52) U.S. Cl.
CPC ...... *B29C 65/7461* (2013.01); *B29C 65/7802* (2013.01); *B29C 65/7891* (2013.01); *B29C 66/112* (2013.01); *B29C 66/131* (2013.01); *B29C 66/24244* (2013.01); *B29C 66/53461* (2013.01); *B29C 66/8161* (2013.01); *B29C 66/8322* (2013.01); *B29C 66/849* (2013.01); *B29C 66/8432* (2013.01); *B65B 51/14* (2013.01); *B65B 61/06* (2013.01); *B29C 66/8242* (2013.01); *B29C 2793/009* (2013.01); *B29L 2031/712* (2013.01); *B65B 31/028* (2013.01)

(58) Field of Classification Search
CPC .............. B29C 65/7461; B29C 66/849; B29C 66/8432; B29C 66/8322; B29C 66/8161; B29C 66/53461; B29C 66/131; B29C 66/112; B29C 65/7891; B29C 65/7802; B29C 65/7451; B29C 65/18; B29C 2793/009; B29C 66/8242; B29L 2031/712
USPC ....... 156/73.1, 60, 64, 583.1, 73.5, 250, 251
See application file for complete search history.

(56) References Cited

U.S. PATENT DOCUMENTS

| 3,505,781 | A | * | 4/1970 | Loewenthal | ............ B65B 7/164 53/329.3 |
| 3,645,825 | A | | 2/1972 | Gaunt et al. | |
| 3,672,113 | A | | 6/1972 | Andra | |
| RE28,584 | E | * | 10/1975 | Marion | ................... B65B 7/167 53/296 |
| 4,502,906 | A | * | 3/1985 | Young | ................ B29C 65/7433 156/251 |
| 4,974,392 | A | | 12/1990 | Mondini | |
| 5,110,227 | A | * | 5/1992 | Hatakeyama | ............ B41J 15/04 226/143 |
| 5,475,965 | A | * | 12/1995 | Mondini | ............... B29C 66/131 53/287 |
| 6,698,165 | B1 | | 3/2004 | Natterer | |
| 2002/0011049 | A1 | * | 1/2002 | Takahashi | ............... B65B 7/164 53/452 |
| 2006/0255201 | A1 | * | 11/2006 | Natterer | .................. B65B 7/164 242/522 |
| 2007/0227099 | A1 | | 10/2007 | Conti | |
| 2012/0267036 | A1 | | 10/2012 | Bartoli et al. | |
| 2013/0118117 | A1 | * | 5/2013 | Grobbel | ............ B29C 66/8322 53/329.2 |
| 2016/0236809 | A1 | * | 8/2016 | Ickert | ...................... B65B 7/164 |
| 2018/0022485 | A1 | * | 1/2018 | Mondini | ............ B29C 65/7461 53/476 |

FOREIGN PATENT DOCUMENTS

| GB | 2451837 B | 2/2009 |
| WO | 2011055325 A2 | 5/2011 |
| WO | 2014091504 A1 | 6/2014 |

* cited by examiner

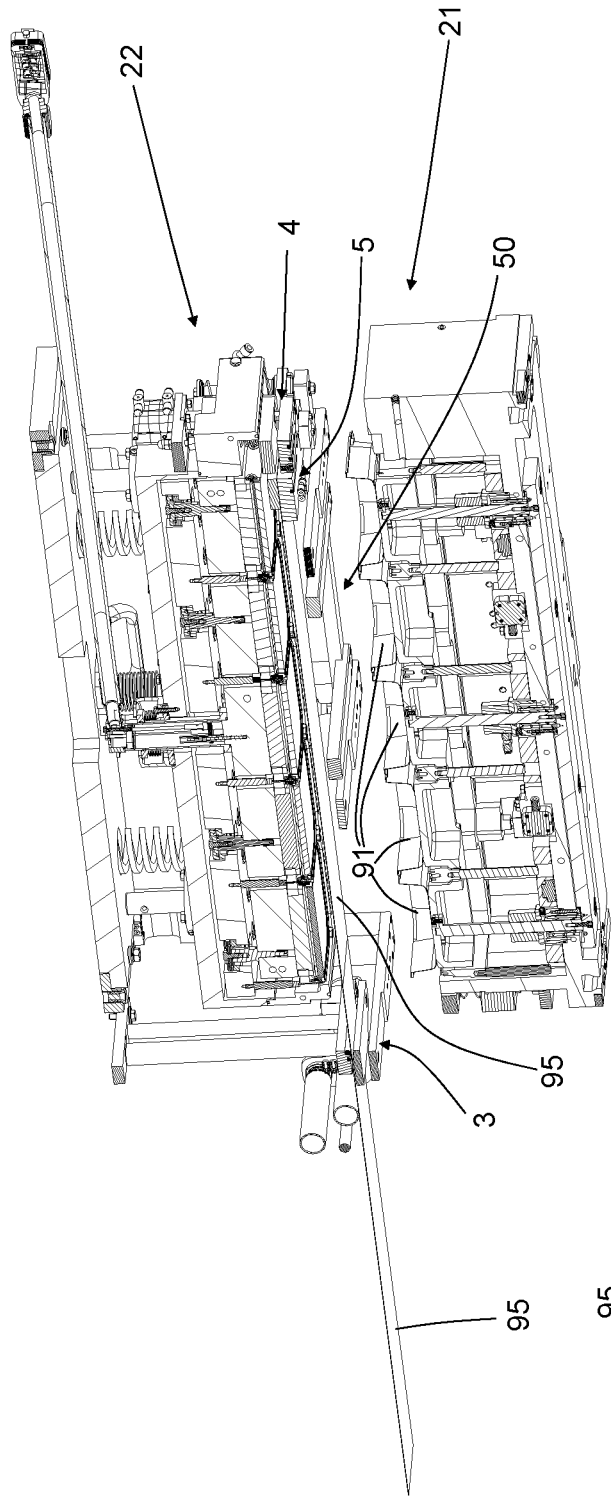
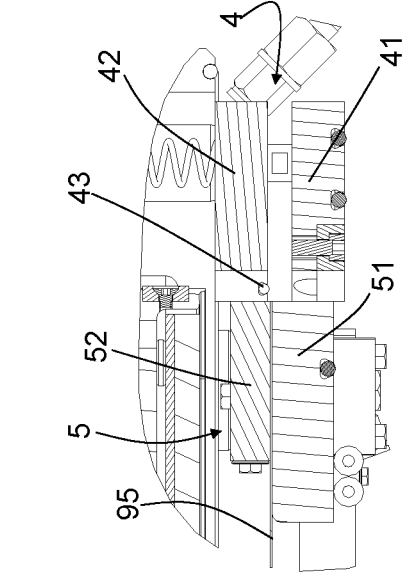
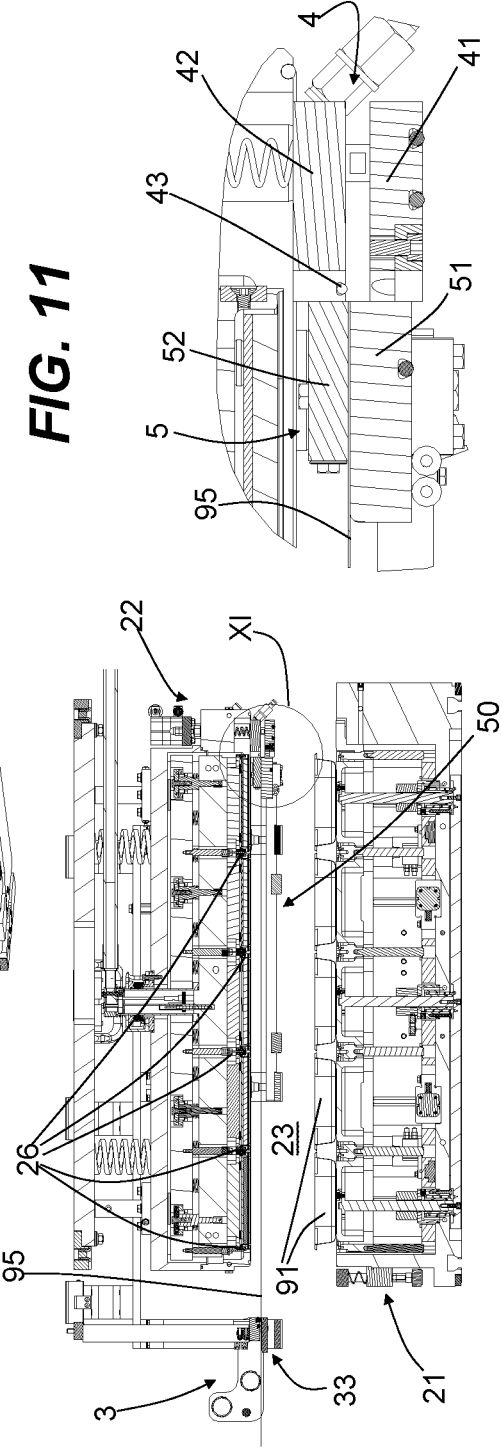
FIG. 11
FIG. 11A
FIG. 11B

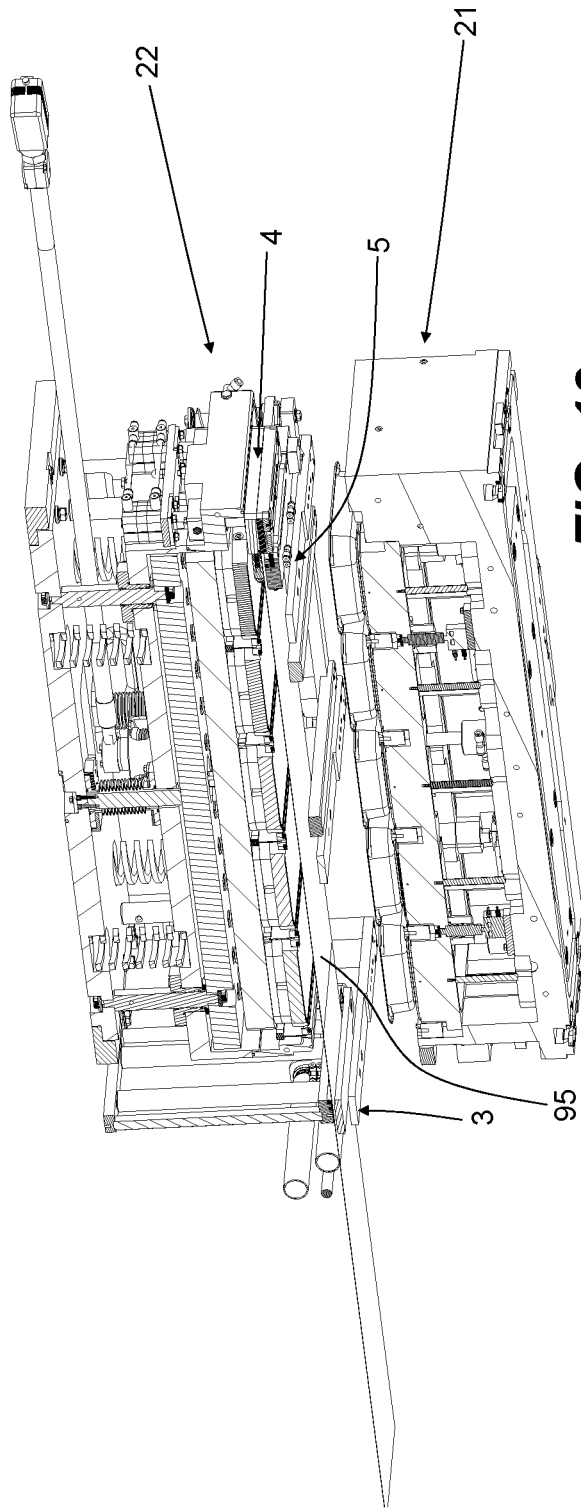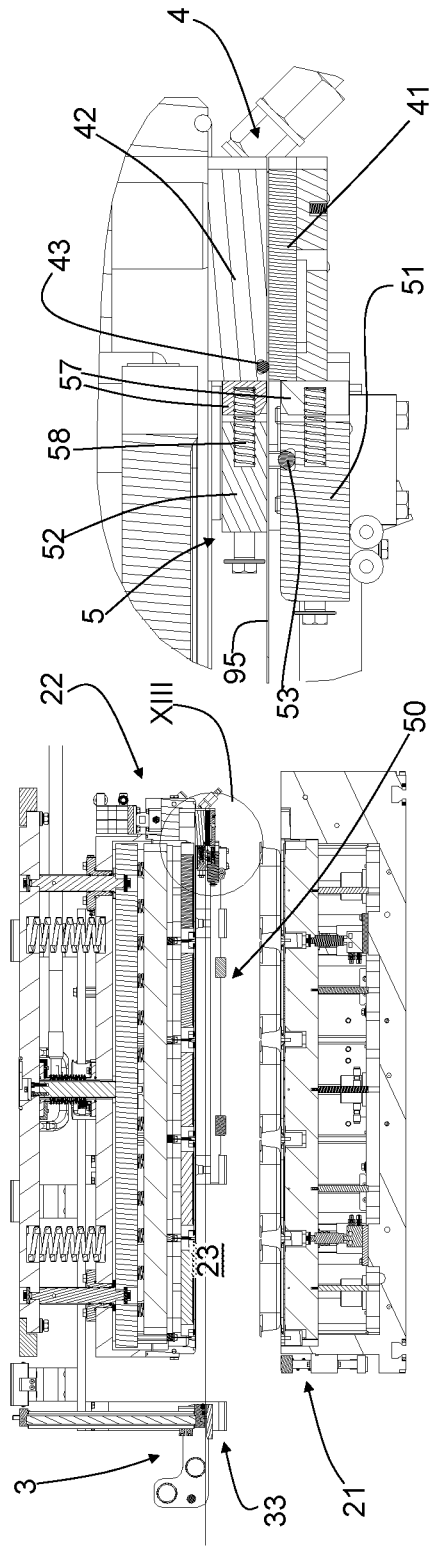

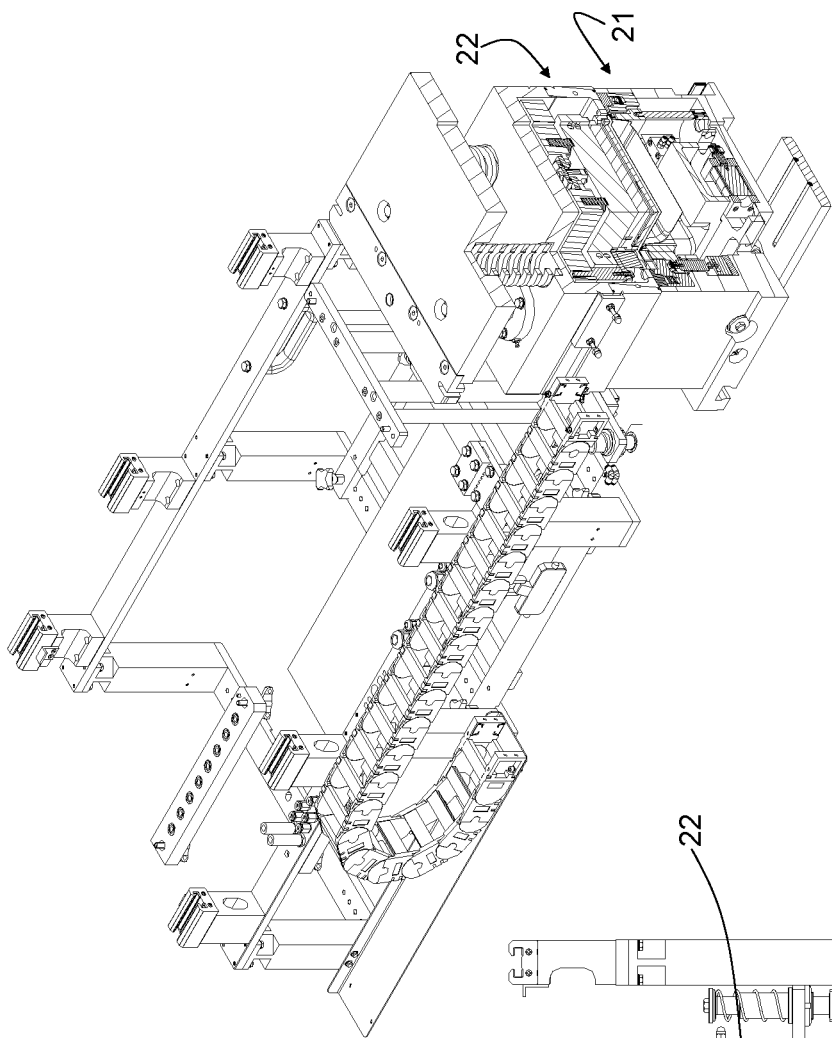
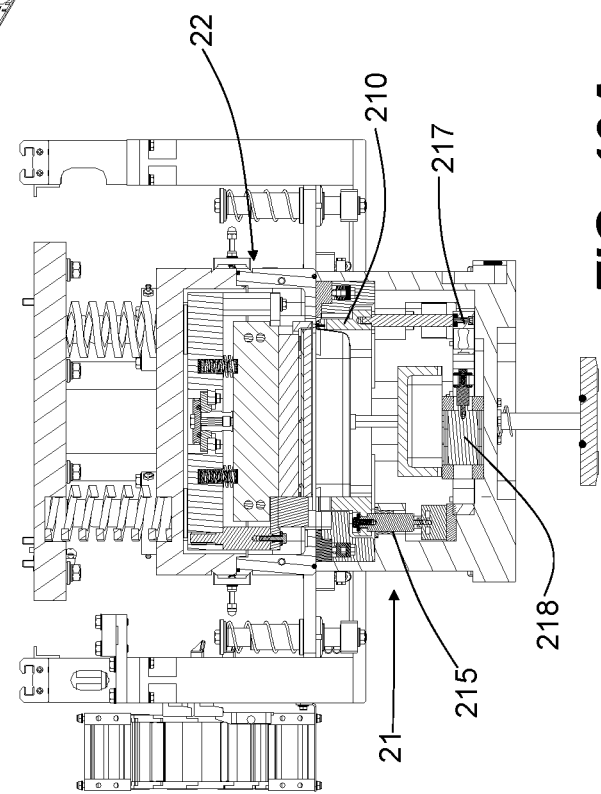
FIG. 19
FIG. 19A

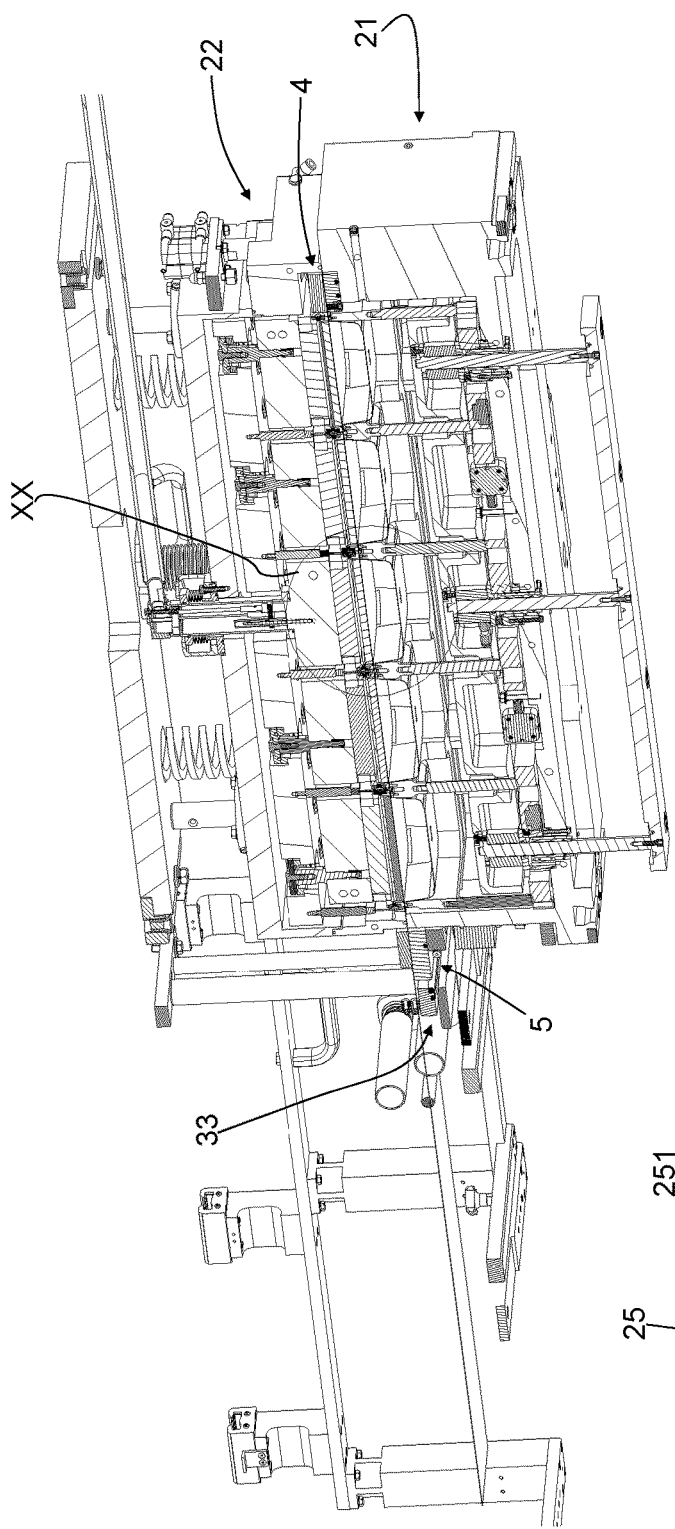
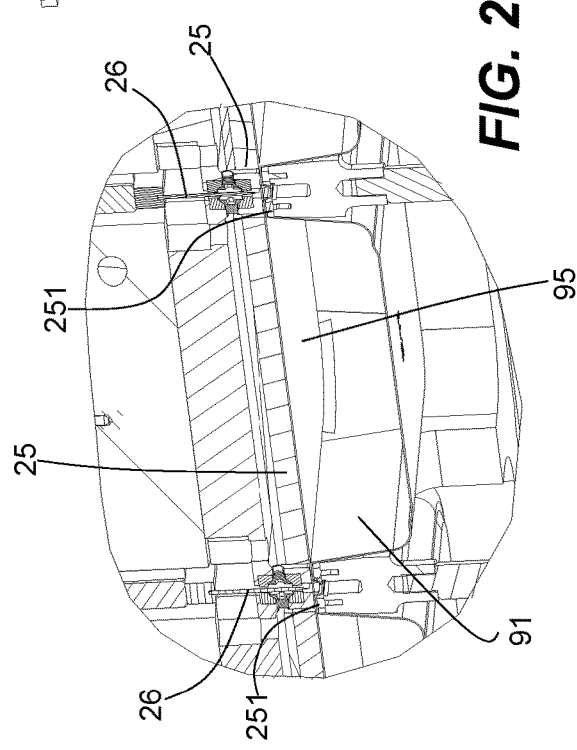
FIG. 20
FIG. 20A

MACHINE FOR SEALING CONTAINERS AND METHOD FOR SEALING A PLURALITY OF CONTAINERS

CROSS-REFERENCE TO RELATED APPLICATIONS

The present application claims the benefit of Italian Patent Application No. 102016000076881 filed on Jul. 21, 2016, which is incorporated herein by reference in its entirety.

DESCRIPTION

This disclosure relates in general to the product packaging sector and in particular it relates to a machine for sealing containers and to a method for sealing a plurality of containers. Specifically, this disclosure relates to a method for sealing a container by applying a closing film on one face of the container, the closing film being, for example, a film made of plastic material intended to be sealed on a perimetric edge of the face of the container.

In the sector there are prior art machines for sealing containers.

For example, patent application No. EP 0 334 266 describes a machine with a sealing station comprising an upper part and a lower part. The containers to be sealed are positioned in the sealing station by a pick up device. A film for sealing the containers passes in the space between the containers and the upper part of the sealing station. The film is supported by a roller upstream of the sealing station and by a roller downstream of the sealing station. One disadvantage of this technical solution is that is produces a considerable quantity of film waste, since only a small part of the film that passes in the sealing station is actually used for sealing the containers.

This disadvantage was dealt with in international patent application No. WO 2014/091504 A1, in which the film is cut into pieces that correspond to the size of the containers to be sealed. The cut pieces are then conveyed into the sealing station, where each piece is sealed on a respective container.

That technical solution substantially allows the elimination of film waste, thanks to the step of cutting to size that precedes sealing.

However, it may be complicated to manage due to the need to convey the cut pieces of film into the sealing station, which require precise positioning on the respective containers to be sealed.

In this context the technical purpose that forms the basis of this disclosure is to provide a machine for sealing containers that allows at least some of the disadvantages of the prior art to be overcome, or that at least offers an alternative solution to the machines currently known.

The technical purpose specified and the aims indicated are substantially achieved by a machine for sealing containers, according to the corresponding independent claim.

This disclosure also relates to a method for sealing a plurality of containers, according to the corresponding independent claim.

Particular embodiments are defined in the corresponding dependent claims. According to one aspect of the solution proposed by this disclosure, the machine comprises a plurality of seats for respective containers to be sealed, the seats being side by side one after another along a longitudinal line between a first side and a second side. The machine also comprises a positioning apparatus capable of positioning a film at the plurality of seats, by means of a gripping device that is movable along the longitudinal line. During use, after the containers to be sealed have been positioned in the seats, the gripping device grips one edge of the film near the first side and, by moving, pulls the film to the second side, where the edge of the film is gripped by another gripping device, which is stationary. The movable gripping device can then return to the position near the first side. This is followed by the operation for sealing the film on the containers. Then the film is cut near the first side and the sealed containers obtained are removed from the machine. The film may be cut between one container and another before removal of the containers from the machine, simultaneously with film cutting near the first side. After other containers to be sealed have been positioned in the seats, the method is repeated and so on.

This is useful because, by positioning each time a stretch of film whose length corresponds to that required for sealing all of the containers in the seats, it is possible to optimise film consumption and substantially reduce waste to zero. In fact, thanks to the movable gripping device, the stretch of film upstream of a previous sealing operation is moved forward until it covers the containers to be sealed in a subsequent operation and can be locked by the stationary gripping device just downstream of the last seat, thereby zeroing film waste downstream of the containers.

Moreover, the positioning of one film simultaneously on multiple containers is easier and less prone to errors than the prior art solution of positioning a respective piece of film on each container. Unlike that prior art solution, in which the pieces of film are cut to size before sealing, with the machine according to this disclosure the film may be cut after sealing, when the film is already adhering to the containers and therefore the cutting operation simply separates the containers from each other.

These advantageous effects are also obtainable from the following method for sealing a plurality of containers according to this disclosure.

A plurality of containers is positioned one after another along a line. A film is positioned on said plurality of containers, in such a way that the film extends along the line from a first container in the sequence to a last container in the sequence, downstream of which one edge of the film is located.

The film is retained upstream of the first container and downstream of the last container and the containers are sealed by fixing the film to the containers.

The film is cut upstream of the first container, thereby creating an edge of the film, and between one container and another, obtaining a plurality of sealed containers that are separated from each other.

In order to seal a subsequent plurality of containers, the same steps are performed. The edge of the film that, after positioning, is downstream of the last container in the sequence is that created by cutting the film upstream of the first container after the previous sealing operation.

In particular, positioning of the film on the plurality of containers is carried out using the same device that, subsequently, retains the film upstream of the first container.

Further features and the advantages of this disclosure are more apparent in the detailed description below, with reference to an example, non-limiting embodiment of a machine for sealing containers. Reference will be made to the accompanying drawings, in which.

Figure 1:
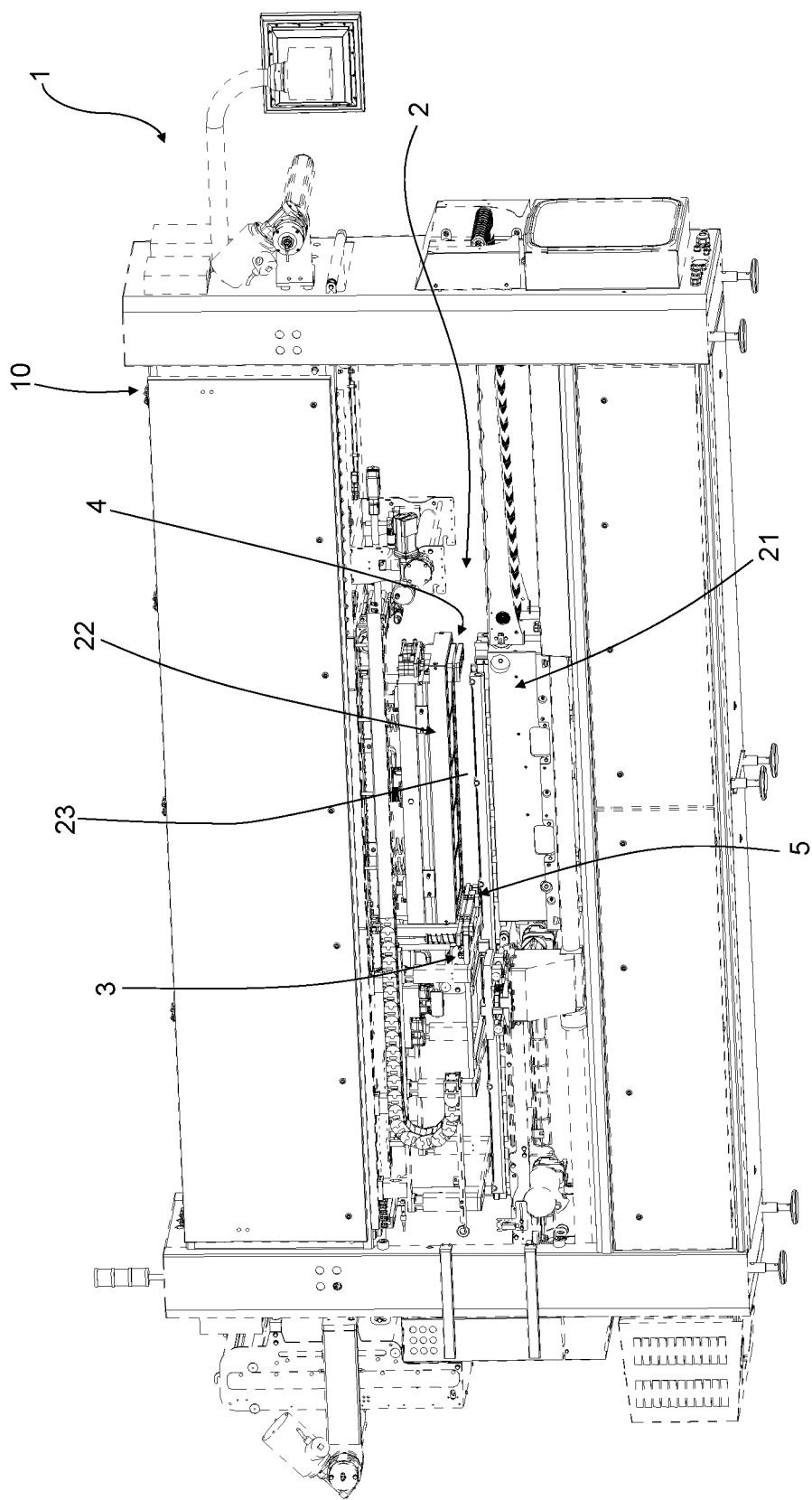
FIG. 1 is an axonometric view of a machine for sealing containers according to this disclosure.
Figure 10:
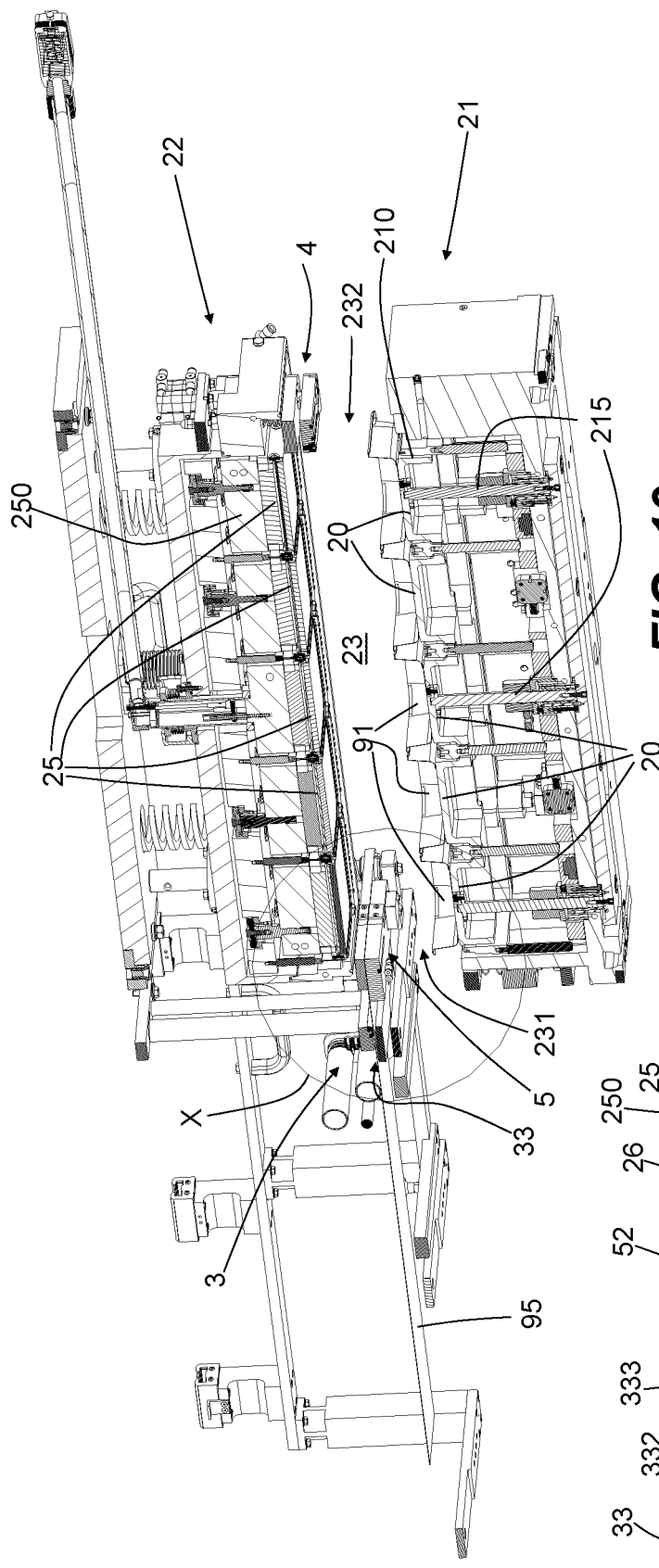
Figure 10A:
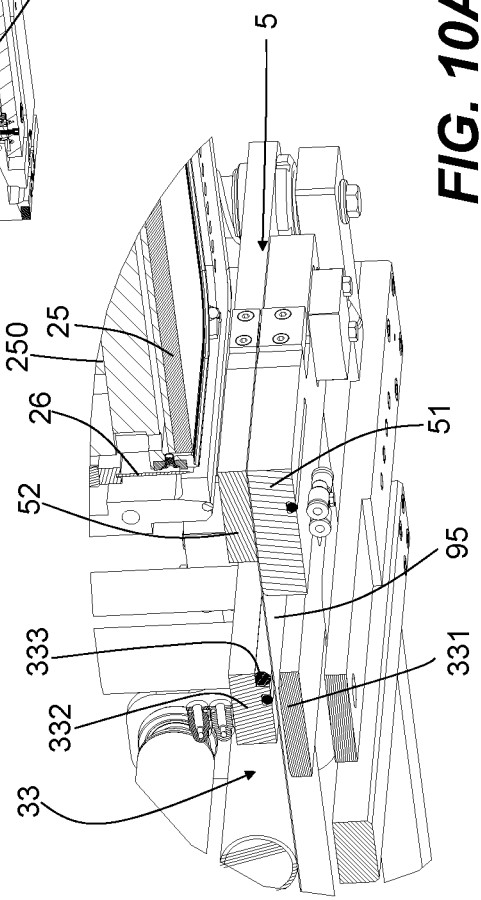
Figure 12:
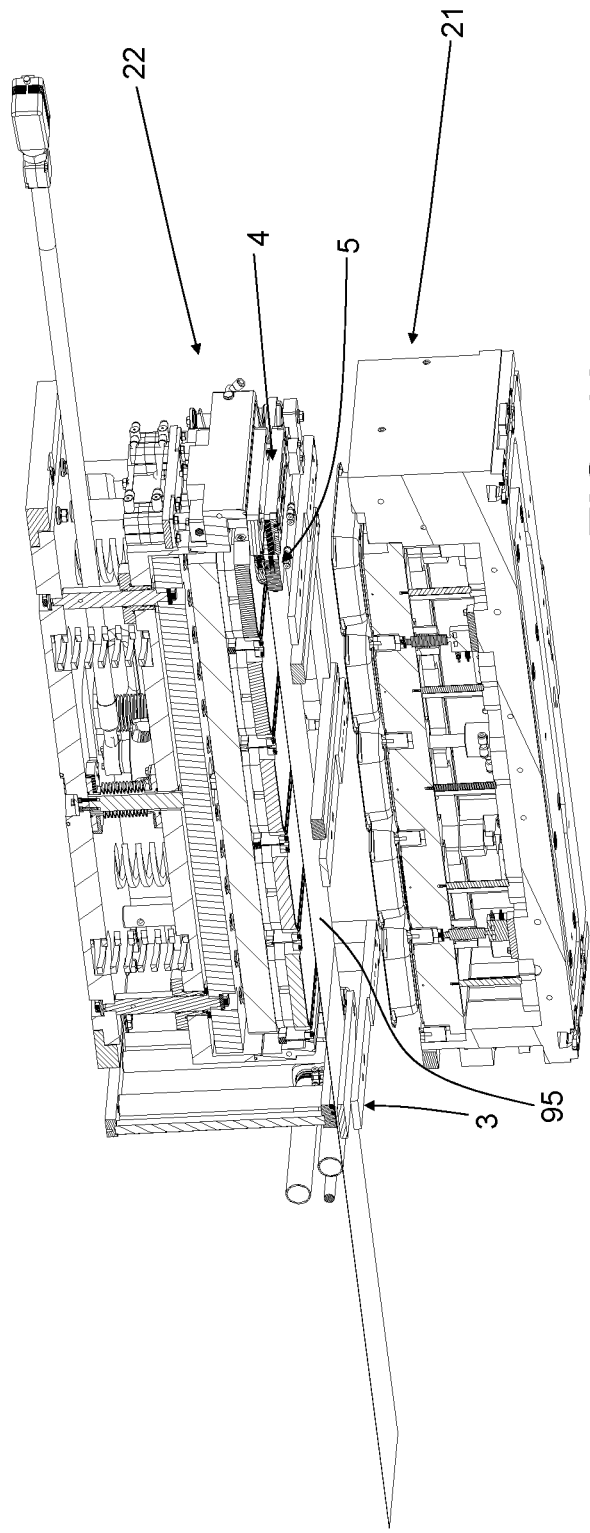
Figure 12B:
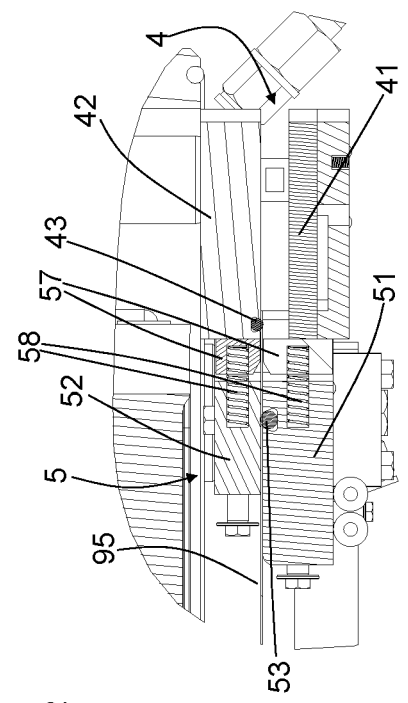
Figure 12A:
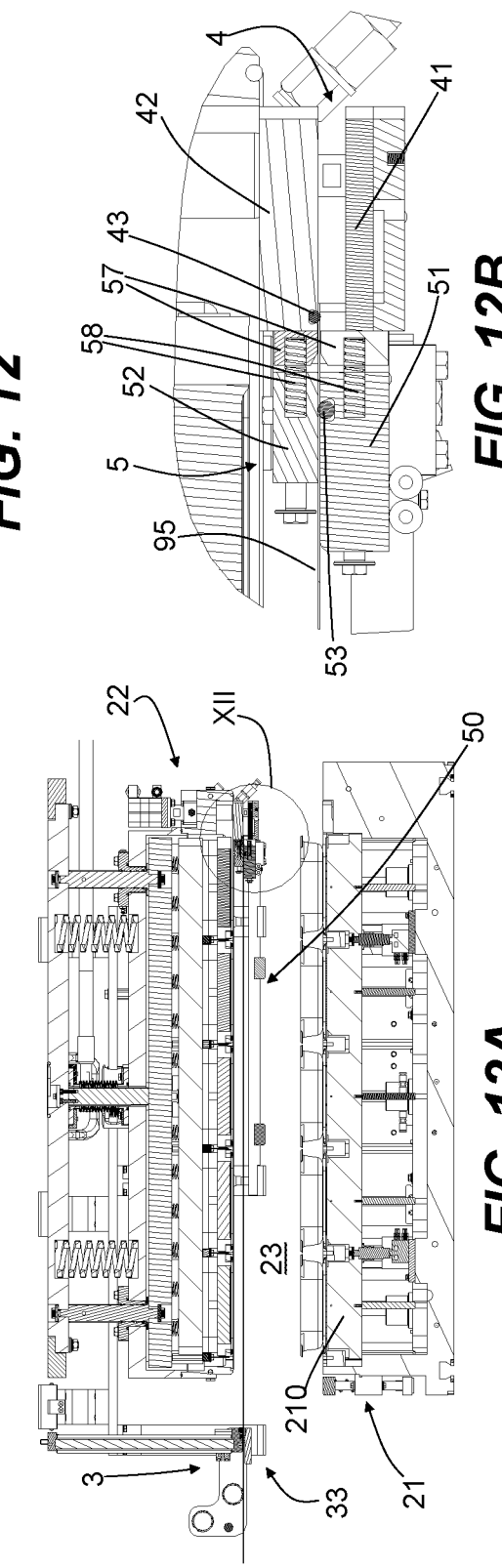
Figure 18:
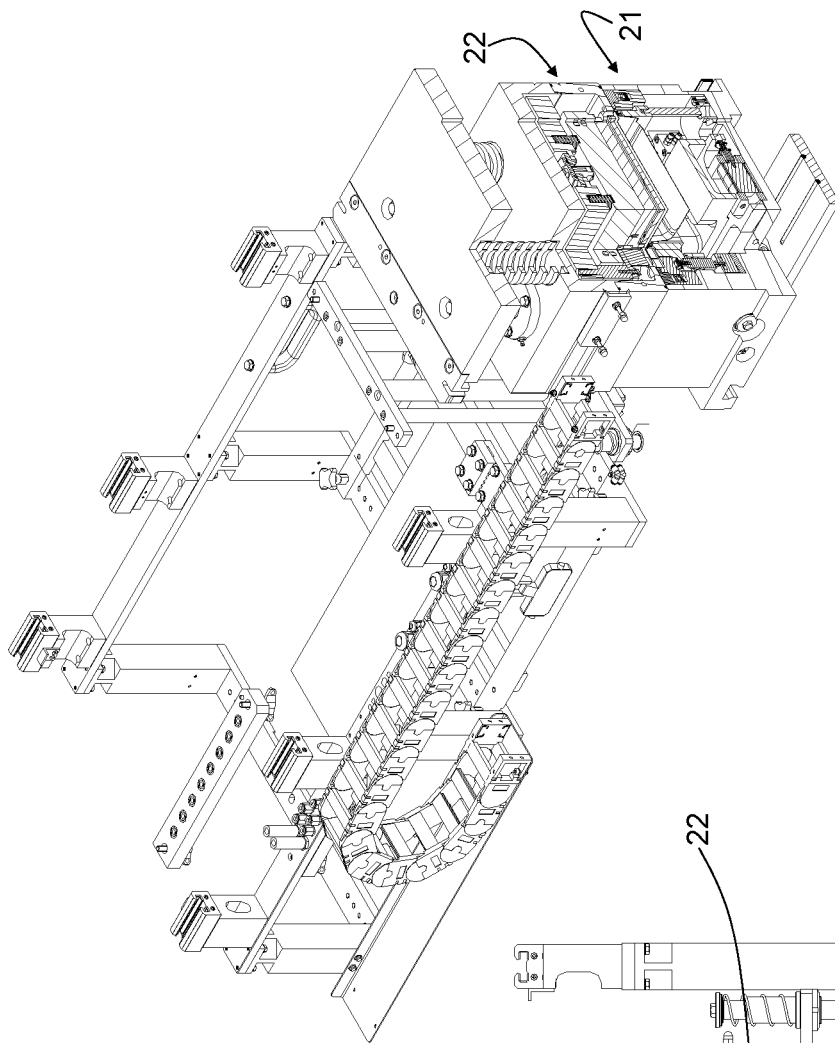
Figure 18A:
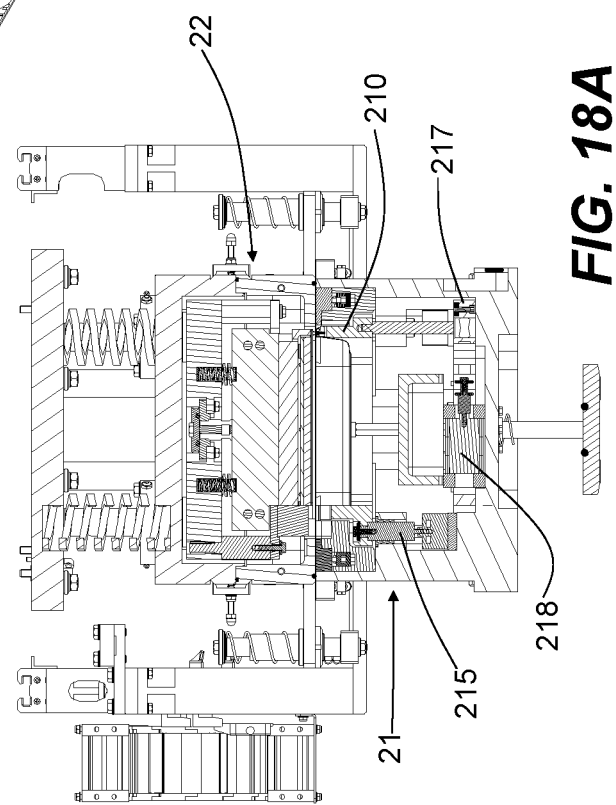
Figure 21:
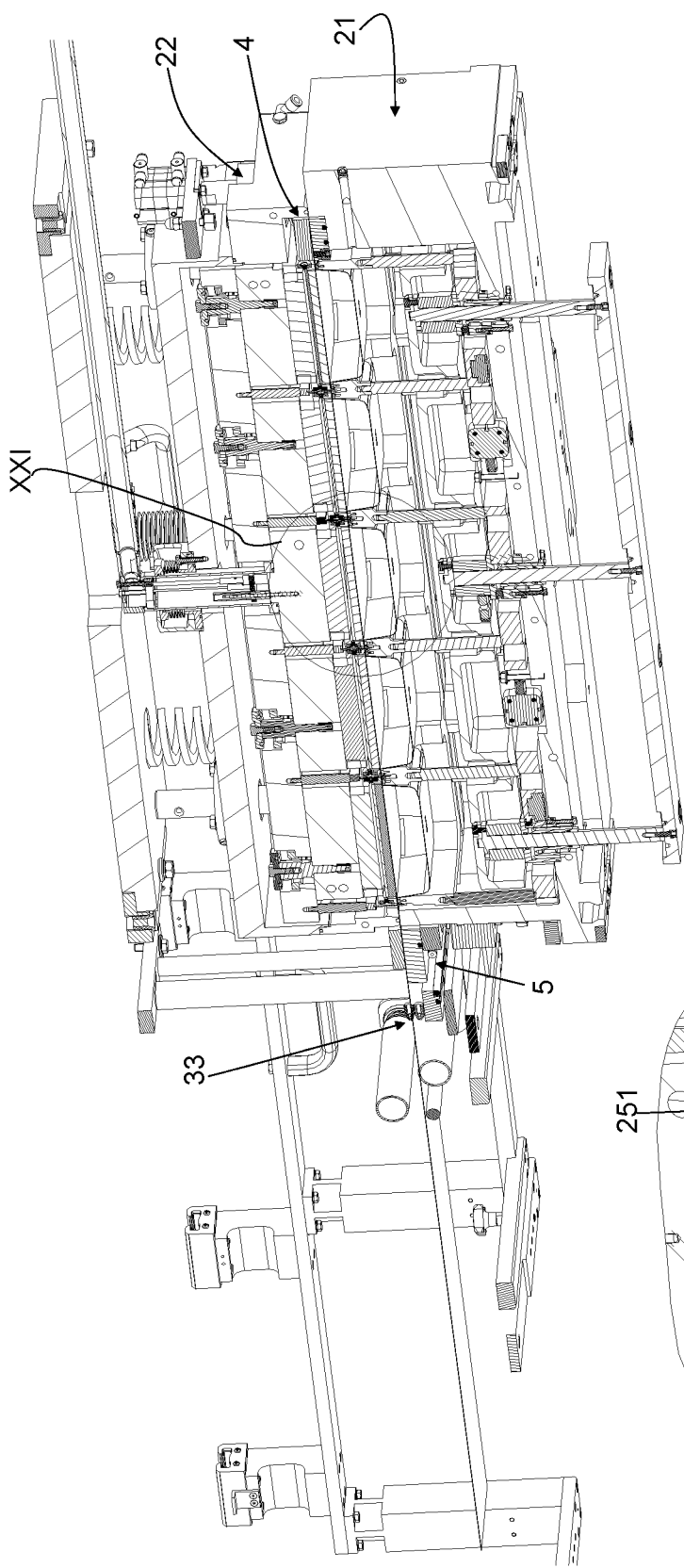
Figure 21A:
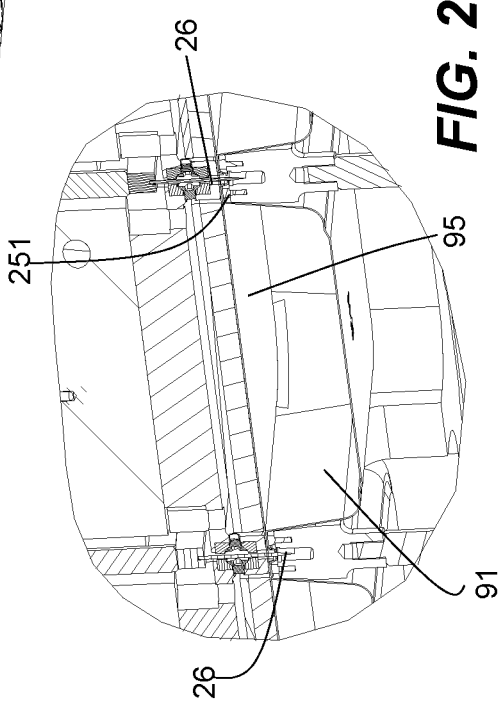
Figure 22:
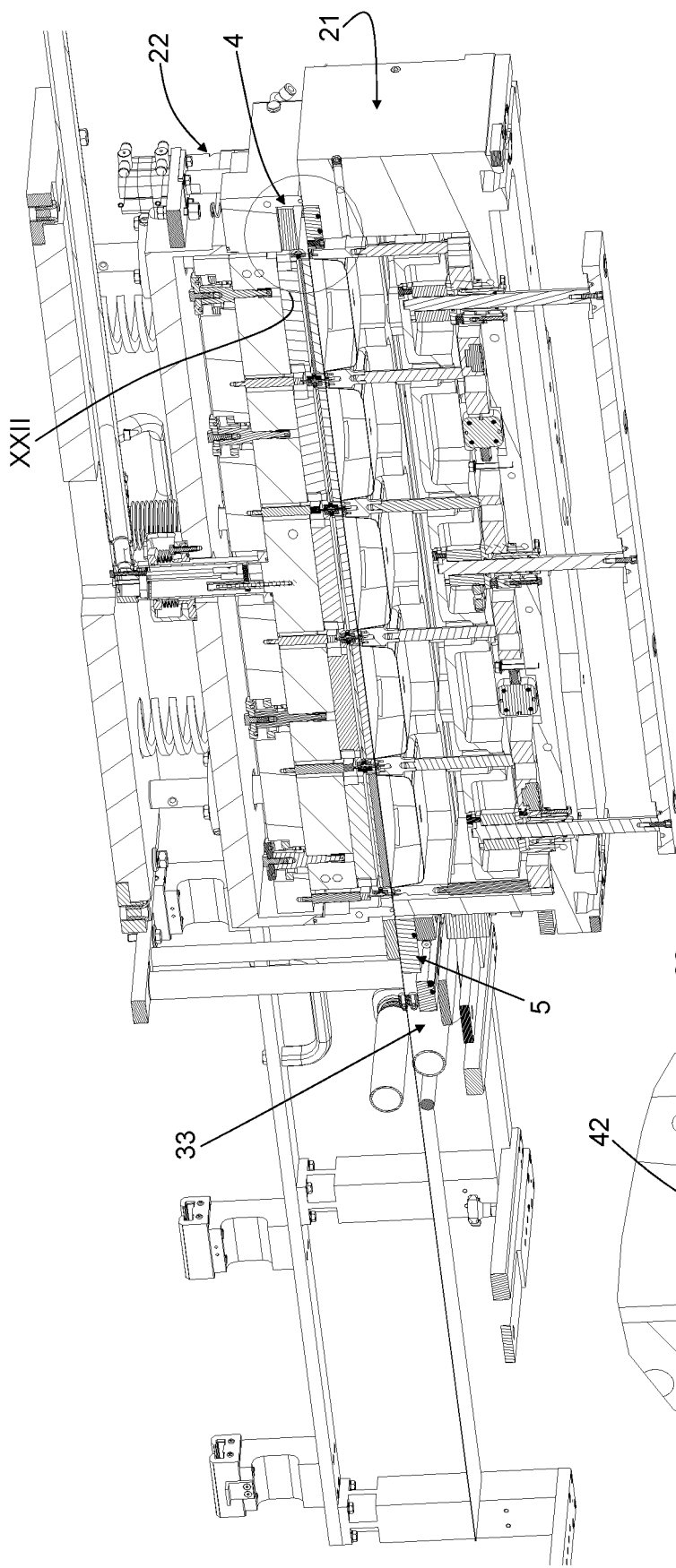
Figure 22A:
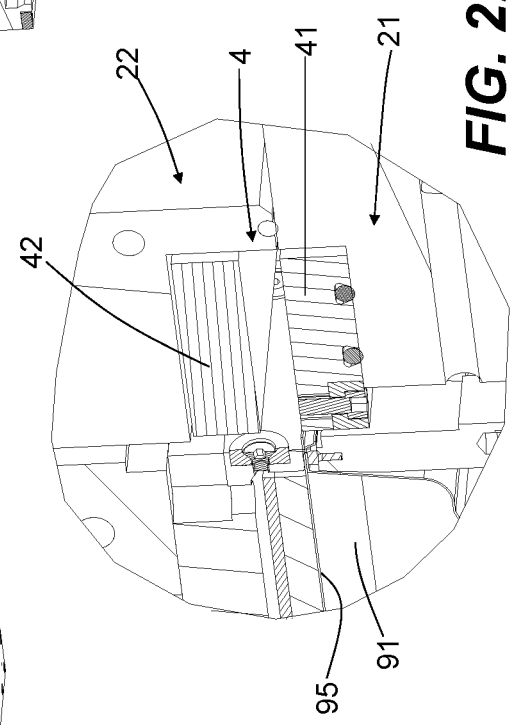
Figure 23:
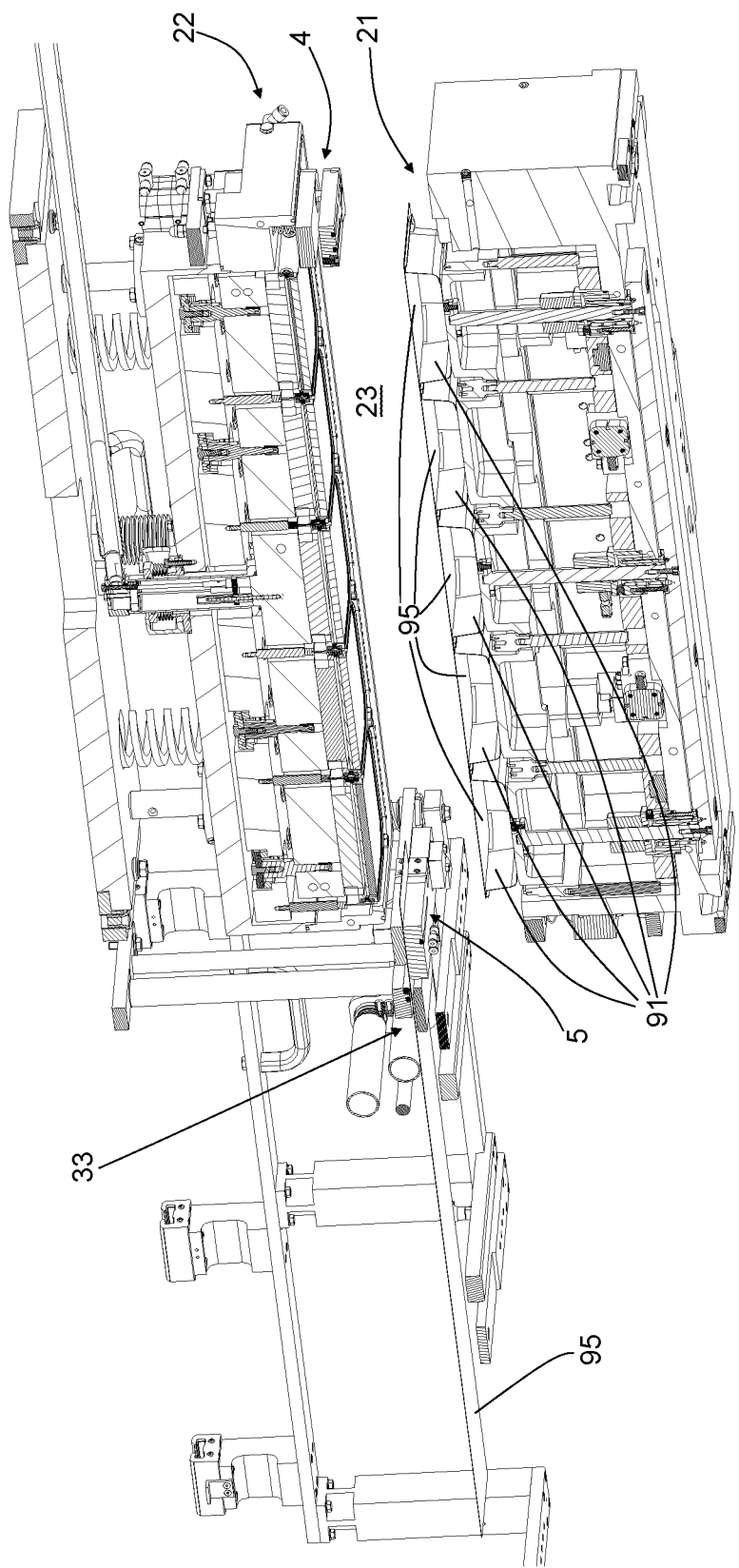
Figure 24:
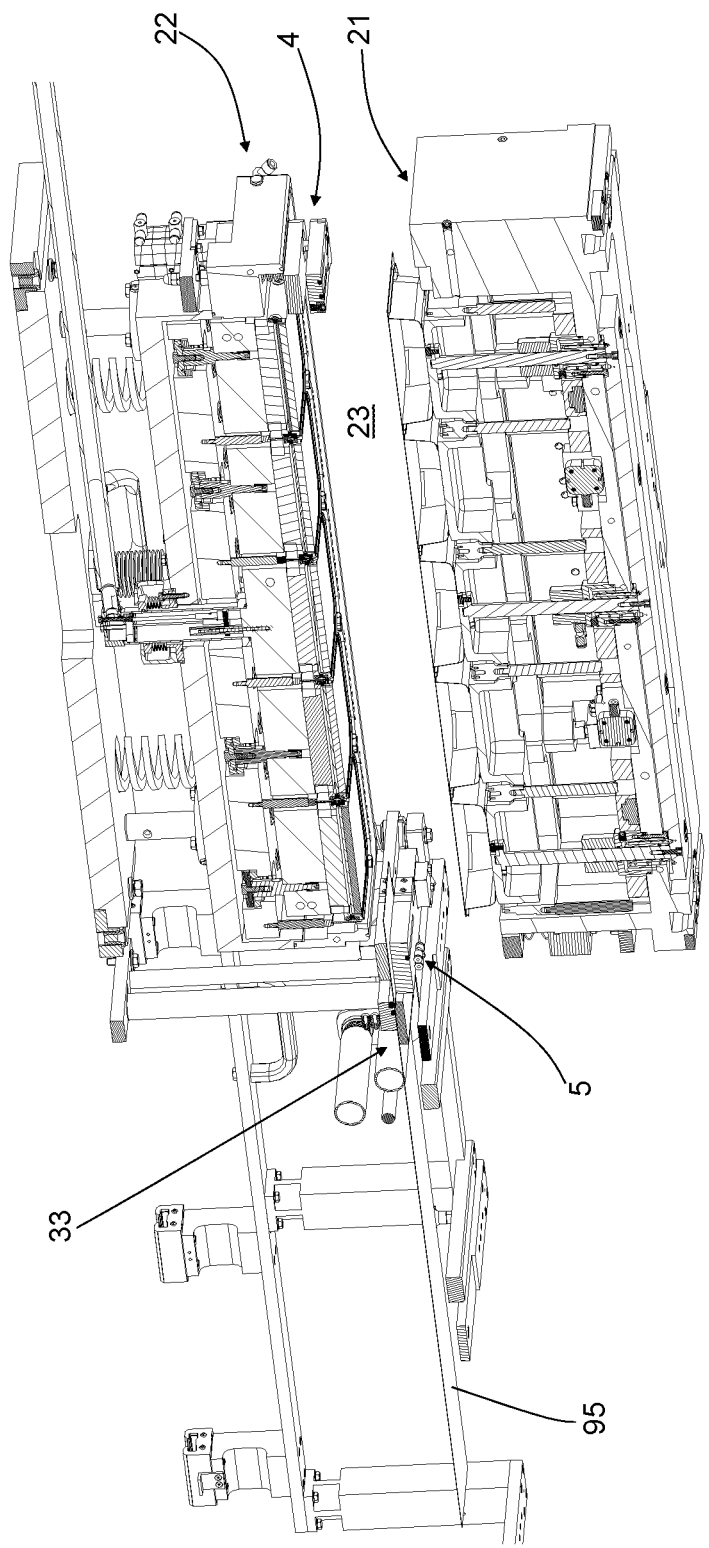
Figure 25:
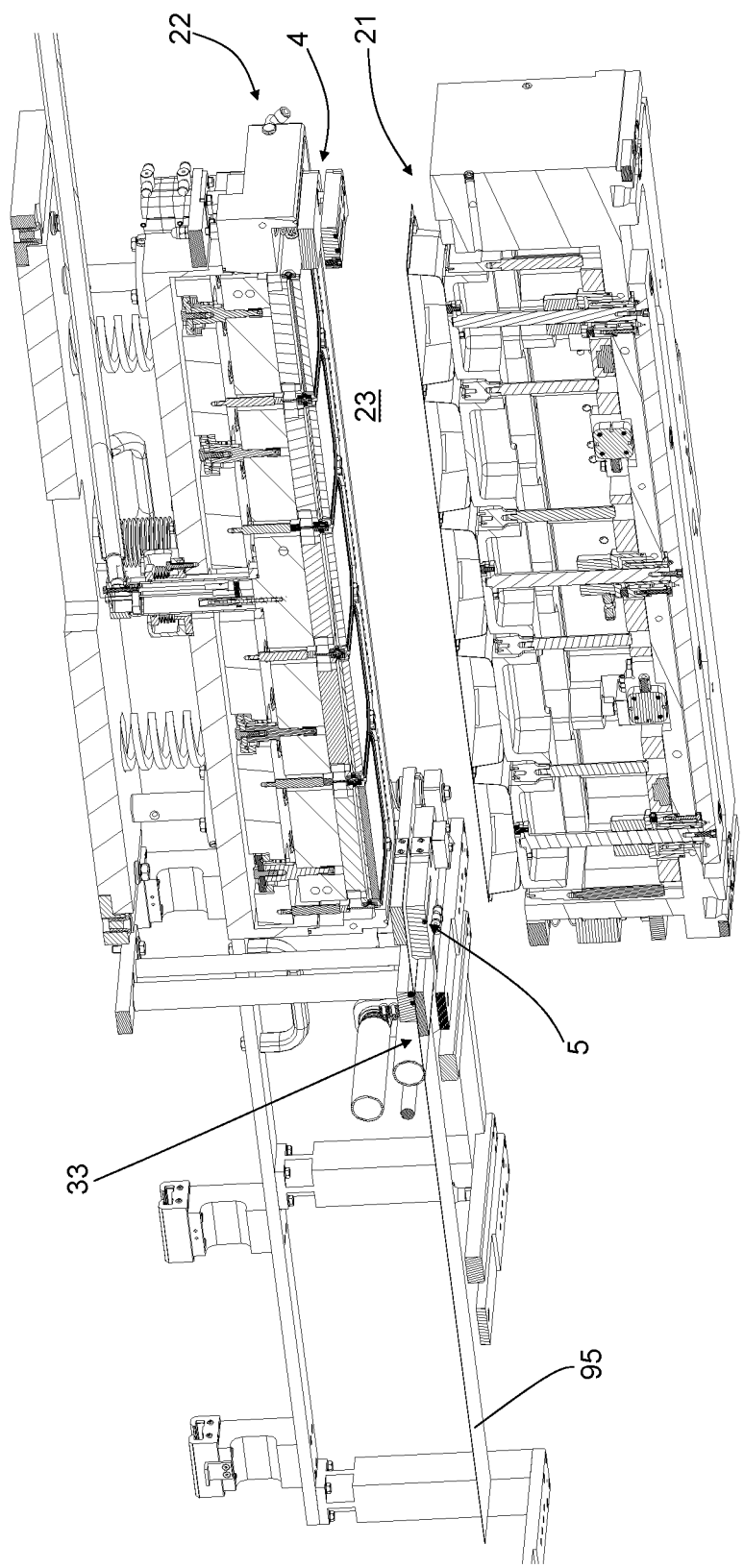
Figure 26:
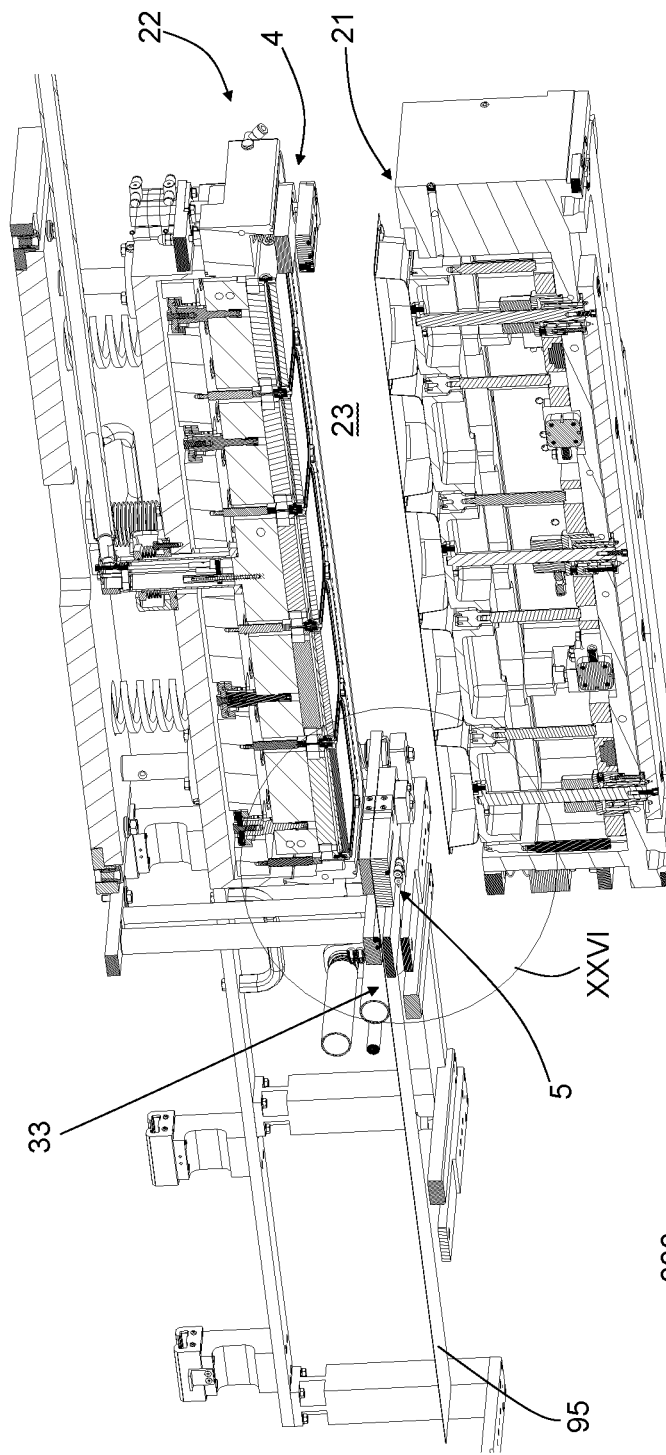
Figure 26A:
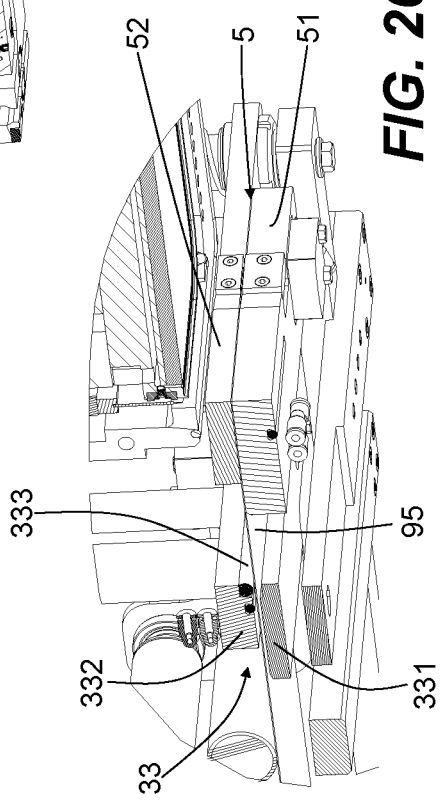

FIGS. 10 to 26 relate to a sequence of operating steps of the machine of FIG. 1; only some components, in particular the components relevant to this disclosure, are shown in each figure. In particular:

FIG. 10 is an axonometric view in longitudinal section and FIG. 10A is an enlarged view of a Detail X of FIG. 10;

FIG. 11 is an axonometric view in longitudinal section, FIG. 11A is a side view in longitudinal section and FIG. 11B is an enlarged view of a Detail XI of FIG. 11A, FIG. 12 is an axonometric view in longitudinal section, FIG. 12A is a side view in longitudinal section and FIG. 12B is an enlarged view of a Detail XII of FIG. 12A;

FIG. 13 is an axonometric view in longitudinal section, FIG. 13A is a side view in longitudinal section and FIG. 13B is an enlarged view of a Detail XIII of FIG. 13A;

FIGS. 14 to 17 are axonometric views in longitudinal section;

FIG. 18 is an axonometric view in cross-section and FIG. 18A is a cross-section;

FIG. 19 is an axonometric view in cross-section and FIG. 19A is a cross-section;

FIG. 20 is an axonometric view in longitudinal section and FIG. 20A is an enlarged view of a Detail XX of FIG. 20;

FIG. 21 is an axonometric view in longitudinal section and FIG. 21A is an enlarged view of a Detail XXI of FIG. 21;

FIG. 22 is an axonometric view in longitudinal section and FIG. 22A is an enlarged view of a Detail XXII of FIG. 22;

FIGS. 23 to 25 are axonometric views in longitudinal section;

FIG. 26 is an axonometric view in longitudinal section and FIG. 26A is an enlarged view of a Detail XXVI of FIG. 26.

With reference to the accompanying figures, the numeral 1 denotes a machine for sealing containers. The machine 1 is suitable for sealing containers (which are labelled 91 and for example are tray-shaped and contain a food product) by applying a film (labelled 95) on the perimetric edge of an open face of the container. There are prior art machines of the same type, therefore this detailed description will not refer to the details of aspects that can be produced similarly to the prior art.

The machine 1 comprises a supporting framework 10, which acts as a support for the machine components, a first jaw member 21 and a second jaw member 22 which is opposite the first jaw member 21.

The first jaw member 21 comprises a plurality of seats 20 that are intended to receive the respective containers 91 to be sealed by application of the film 95. In particular, each seat 20 comprises a supporting surface for a container 91, which is positionable in such a way that the face to be sealed faces the second jaw member 22. The seats 20 are made in a container-holding plate 210 that is movable relative to the body of the first jaw member 21 towards and away from the second jaw member 22. The movement of the container-holding plate 210 is driven by at last one hydraulic cylinder 215. A locking unit 217, controlled by a respective hydraulic cylinder 218, is shiftable between an inactive position (FIG. 18A) and an active position in which the locking unit 217 locks the container-holding plate 210 in the condition near the second jaw member 22 (FIG. 19A). For example, the locking unit 217 is a locking plate.

In an alternative embodiment, each seat 20 may be shaped to match the container 91, in order to receive the container in such a way as to leave exposed the face to be sealed.

The seats 20 are side by side one after another along a longitudinal line 200. Specifically, the seats 20 are near each other in such a way that, as shown in FIGS. 10 to 26, the faces to be sealed of the containers 91 positioned in them are substantially adjacent to each other, with a slight distance between the perimetric edges of adjacent containers.

If necessary, in an alternative embodiment not illustrated in the figures, the seats 20 may be arranged in parallel longitudinal rows, in each of which the seats 20 are side by side one after another.

Figure 2:
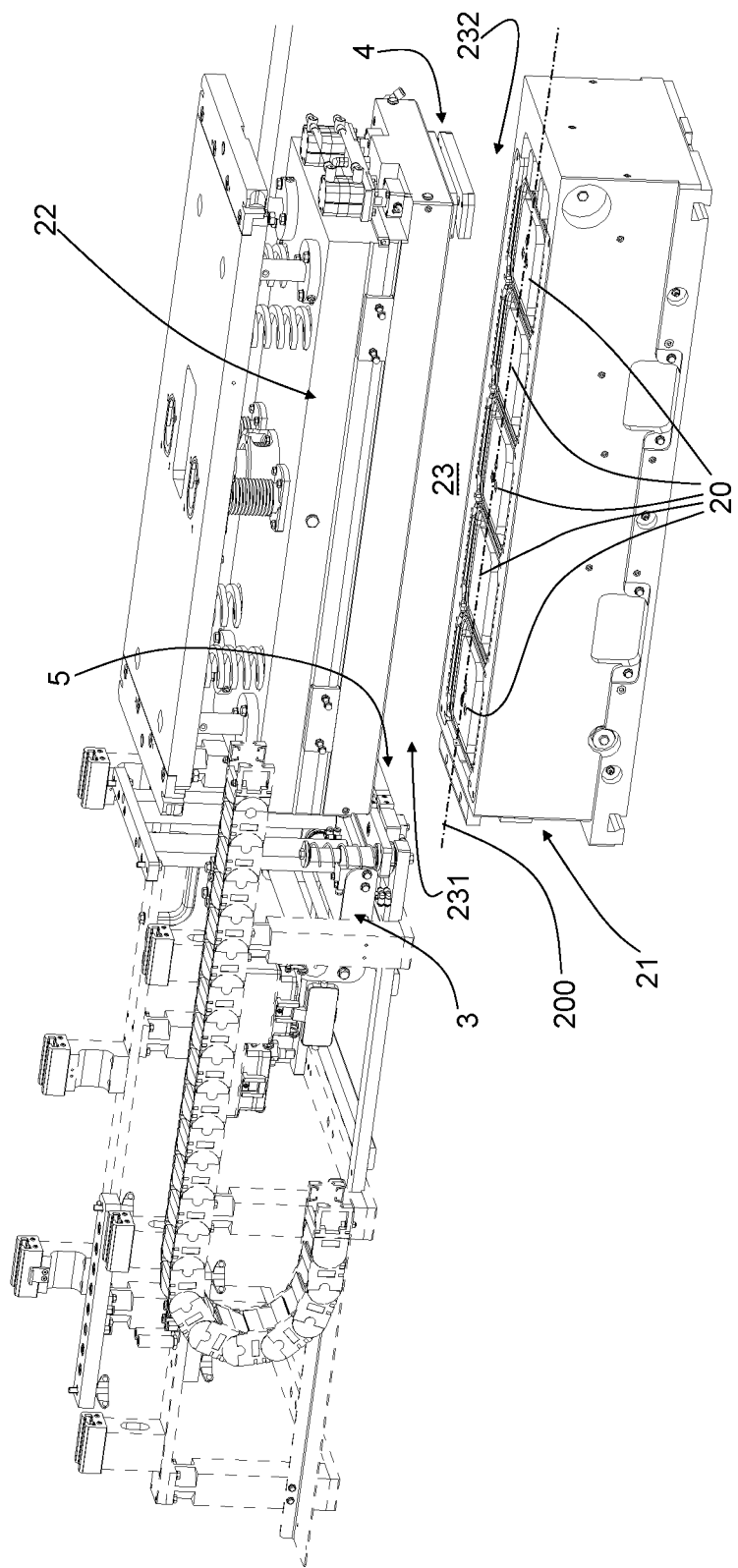
FIG. 2 is an axonometric view of a part of the machine of FIG. 1, with some parts removed and showing the components relevant to this disclosure.
Figure 4:
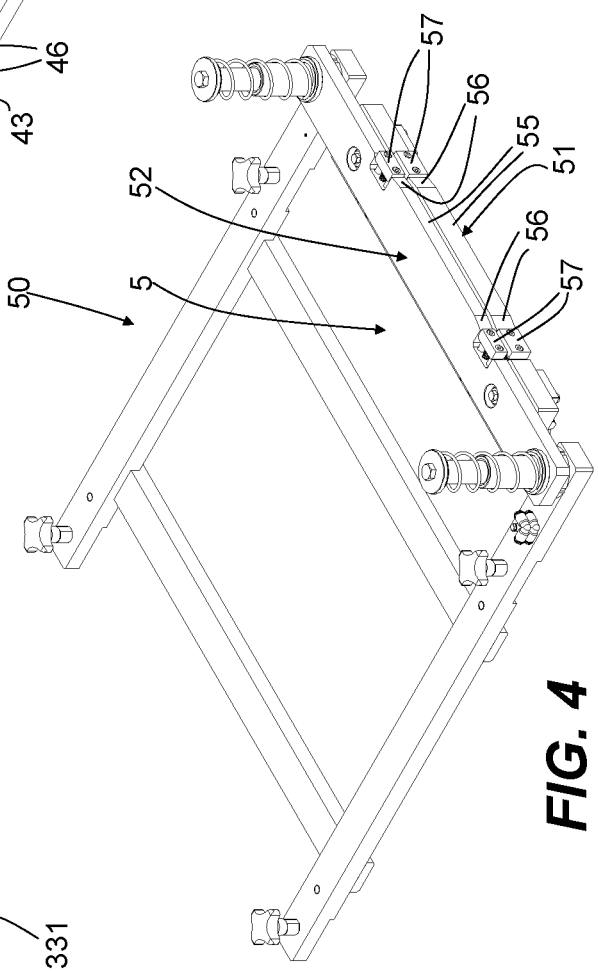
FIG. 4 is an axonometric view of a second gripping device of the machine of FIG. 1.
Figure 5:
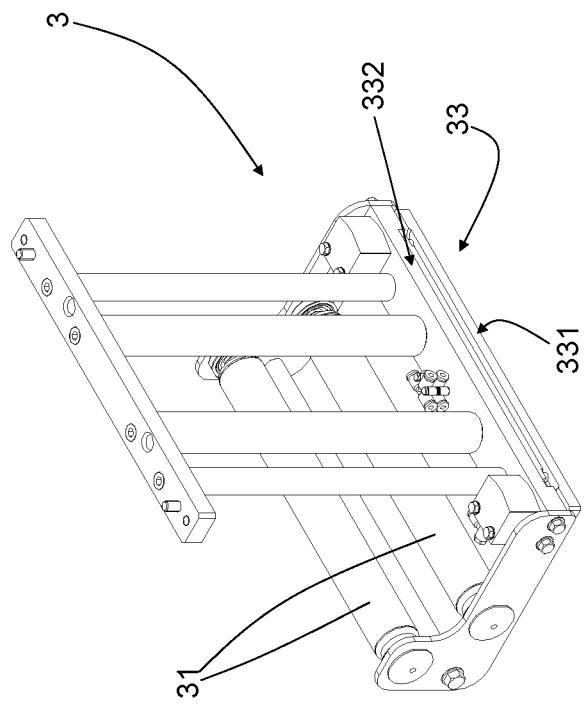
FIG. 5 is an axonometric view of a third gripping device of the machine of FIG. 1.

The second jaw member 22 is opposite the first jaw member 21 and facing the seats 20. The first jaw member 21 and the second jaw member 22 are movable one relative to the other between a first condition, in which the two jaw members 21, 22 are separated from each other by an interspace 23 (as shown for example in FIG. 2 and in FIG. 10), and a second condition, in which the two jaw members 21, 22 are clamped together (as shown, for example, in FIG. 17). In the first condition the interspace 23 is suitable for receiving a film 95, which therefore in use is positioned between the faces to be sealed of the containers 91 and the second jaw member 22. In the second condition, in use the two jaw members 21, 22 press between them the film 95 and the containers 91 in the seats 20.

In other words, the two jaw members 21, 22 form a kind of mould 2, in which the first condition is an open condition and the second condition is a closed condition. Specifically, the first jaw member 21 is a lower member and the seats 20 face upwards, so that the containers 91 rest on them by gravity; the second jaw member 22 is an upper member and the direction of relative movement is a vertical movement.

A movement system, not illustrated in detail in the figures and comprising for example hydraulic cylinders, drives the movement of the first jaw member 21 and of the second jaw member 22 relative to each other. In particular, the second jaw member 22 is stationary relative to the supporting framework 10 and the first jaw member 21 is movable relative to the supporting framework 10, with an upward movement for closing the mould 2 and a downward movement for opening the mould 2.

The longitudinal line 200, along which the seats 20 are arranged side by side one after another, extends between a first side 231 and a second side 232 of the interspace 23.

Therefore, a first seat 20 is closest to the first side 231 of the interspace 23 and a last seat 20 is closest to the second side 232 of the interspace 23.

A sealing system is associated with the first jaw member 21 or with the second jaw member 22 and is suitable for sealing the film 95 on the containers 91 in the seats 20 when the two jaw members 21, 22 are in the second condition, obtaining sealed containers. In the embodiment illustrated, the sealing system is included in the second jaw member 22 and comprises a plurality of sealing plates 25 that, in use, are heated by a heater 250 of the electric heating element type. In particular, for each seat 20 there is a respective heating plate 25 which, in use, is intended to make contact with the film 95 and to press it against the perimetric edge of the container 91 in the respective seat 20, operating in conjunction with a respective contact surface 251 surrounding the perimeter of the seat 20 (FIG. 20A).

A film cutting system is associated with the first jaw member 21 or with the second jaw member 22 and is capable of cutting the film 95 along cutting lines positioned between one seat 20 and another, that is to say, in use between one container 91 and another. Moreover, the film cutting system is capable of cutting the film 95 along a cutting line positioned upstream of the first seat 20 closest to the first side 231 of the interspace 23. Specifically, the cutting lines are perpendicular to the longitudinal line 200.

In particular, the cutting system comprises a plurality of blades 26, one for each cutting line, that are mounted on the second jaw member 22 and are movable between a retracted position, in which they do not project into the interspace 23, and a cutting position in which they project into the interspace 23 and, when the jaw members 21, 22 are in the second, closed condition, are inserted in corresponding seats in the first jaw member 21, thereby cutting the film 95 along the respective cutting lines. In particular, said corresponding seats are hollows made in the contact surfaces 251 for the sealing plates 25 (FIG. 21A). An actuating system controls the movement and operation of the blades 26.

The machine 1 may comprise a system for positioning the containers to be sealed 91 in the seats 20, when the two jaw members 21, 22 are in the first, open condition. The machine 1 may also comprise a system for picking up the sealed containers 91 from the seats 20, after sealing of the film 95 and subsequent re-opening of the jaw members 21, 22. Those positioning and pick up systems are not shown in detail in the figures and they can be produced similarly to the prior art.

The machine 1 may comprise a device for removing air from and injecting gas into the interspace 23. That device can be operated when the two jaw members 21, 22 are in the second, closed condition, in which the interspace 23 remaining between them is substantially sealed relative to the outside. The device is used for eliminating the air from the containers before sealing and for substituting it with a protective atmosphere or with a modified atmosphere. This device can also be made similarly to the prior art.

The machine 1 comprises a film feeding device 3. For example, the film feeding device 3 comprises idle rollers 31 for guiding the film 95 that arrives from a roll of film (not shown) that is gradually unwound during use. The feeding device 3 also comprises a retaining device 33 for releasably retaining the film 95, as described in more detail below.

The film feeding device 3 is facing the first side 231 of the interspace 23, therefore the film 95 enters the interspace 23 from the first side 231.

The machine 1 comprises a positioning apparatus suitable for positioning the film 95 in the interspace 23 between the first jaw member 21 and the second jaw member 22.

Figure 6:
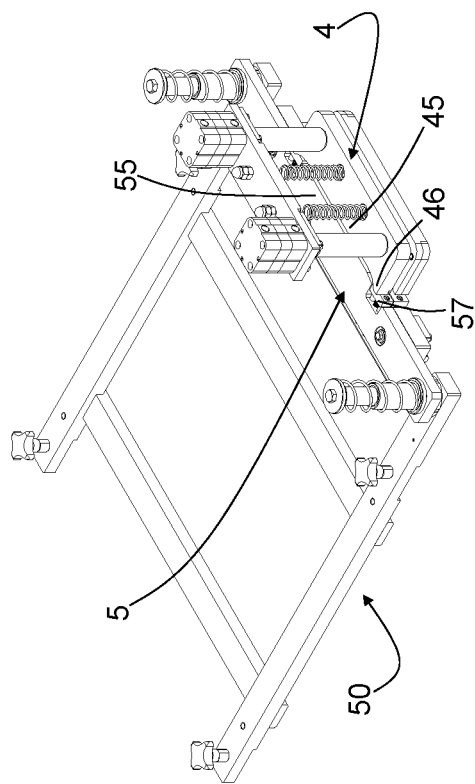
FIG. 6 shows a relative position of the second gripping device of FIG. 4 and of the third gripping device of FIG. 5.
Figure 9:
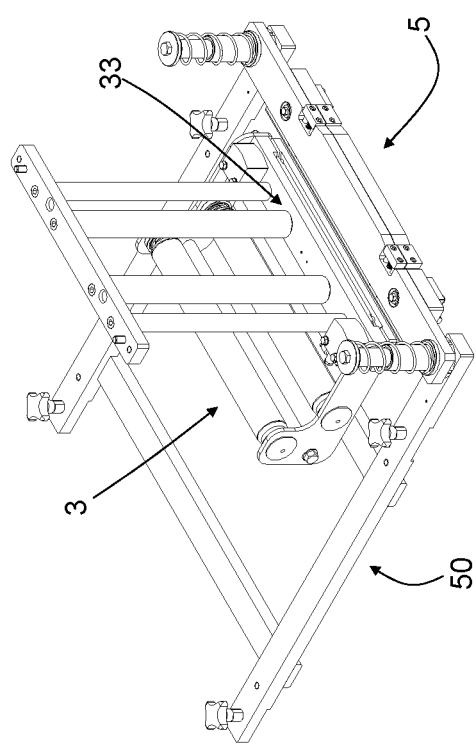
FIG. 9 shows another relative position of the first gripping device of FIG. 3 and of the second gripping device of FIG. 4.

According to one aspect of this disclosure, the positioning apparatus comprises a first gripping device 4, which is positioned at the second side 232 of the interspace 23, and a second gripping device 5, that is movable parallel to the longitudinal line 200 between a first position close to the film feeding device 3 (FIGS. 6 and 10) and a second position close to the first gripping device 4 (FIGS. 9 and 12). Each gripping device 4, 5 is closable or openable for gripping or releasing, respectively, the film 95.

The function of the second gripping device 5 is pulling the film 95 into the interspace 23, positioning the film 95 and preparing it for the step of sealing the containers 91. For this purpose, the second gripping device 5 in the first position is capable of gripping one edge of the film 95 which projects from the film feeding device 3. Moreover, the second gripping device 5 is capable of pulling the film 95 (after having gripped it in the first position) with a movement towards the second position. Thanks to this movement, the film 95 is pulled into the interspace 23 and is positioned at the plurality of seats 20, over the containers 91. It should be noticed that the film positioned in the interspace 23 is a strip or stretch of film 95 that has not yet been cut into portions for the individual containers 91. In fact, that stretch of film extends between the first side 231 and the second side 232 and is at all of the seats 20.

The function of the first gripping device 4 is to hold the film 95 in position in the interspace 23 before and during the sealing step. For this purpose, the first gripping device 4 is capable of gripping the edge of the film 95 when the second gripping device 5 is in the second position (that is to say, after having pulled the film into the interspace 23). When the film 95 is retained by the first gripping device 4, the film is positioned between the first gripping device 4 and the film feeding device 3, whilst the second gripping device 5 can release the film 95 and return to the first position.

In particular, after positioning of the film 95 in the interspace 23 and during the step of sealing the film 95 on the containers 91, the function of the first gripping device 4 is to retain the film 95 from the second side 232 of the interspace 23, whilst the function of the second gripping device 5 is to retain the film 95 from the first side 231 of the interspace.

In the embodiment illustrated, the first gripping device 4 comprises a first plate element 41 and a second plate element 42, that are movable one relative to the other in a first direction for clamping the film 95 between them and in a second direction for releasing the film 95. In practice, the plate elements 41, 42 form a jaw.

The plate elements 41, 42 extend in the plane of the positioned film (in particular, in a horizontal plane) and are movable perpendicularly to said plane. Specifically, the first plate element 41 is a lower element and is moved by an actuating device relative to the second plate element 42 which is an upper element and is fixed to a structure of the first gripping device 4. In order to securely retain the film 95 clamped between them, the contact with the film 95 occurs at projecting inserts 43 (for example made of rubber or another elastic material) that are mounted on one of the plate elements and project towards the other plate element.

Figure 3:
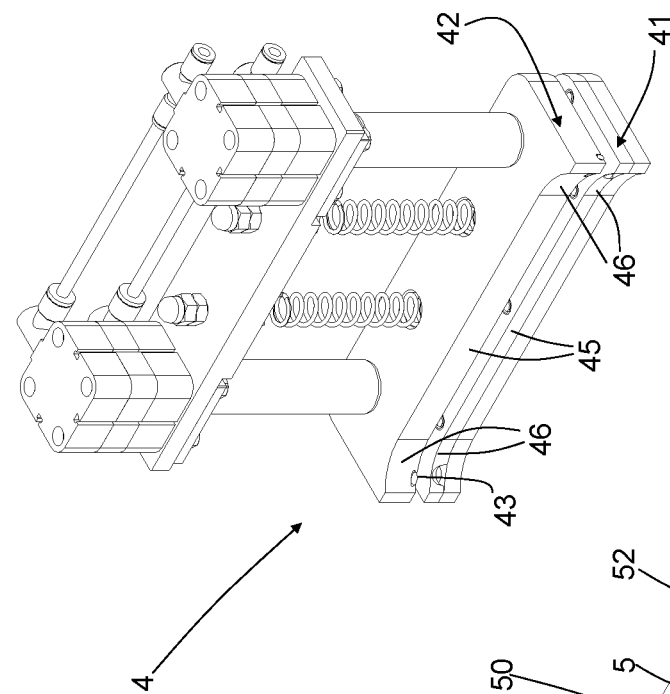
FIG. 3 is an axonometric view of a first gripping device of the machine of FIG. 1.
Figure 3A:
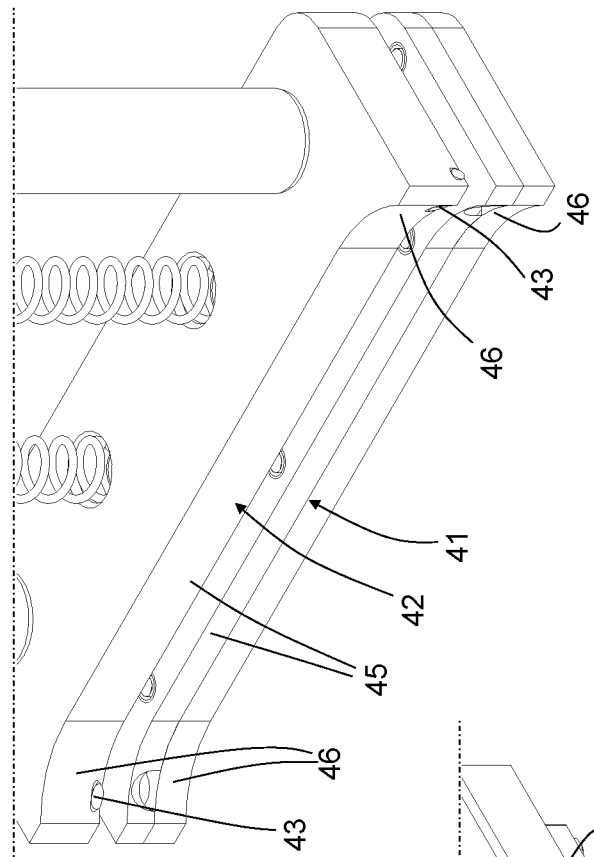
FIG. 3A is an enlarged view of a part of the first gripping device of FIG. 3.
Figure 4A:
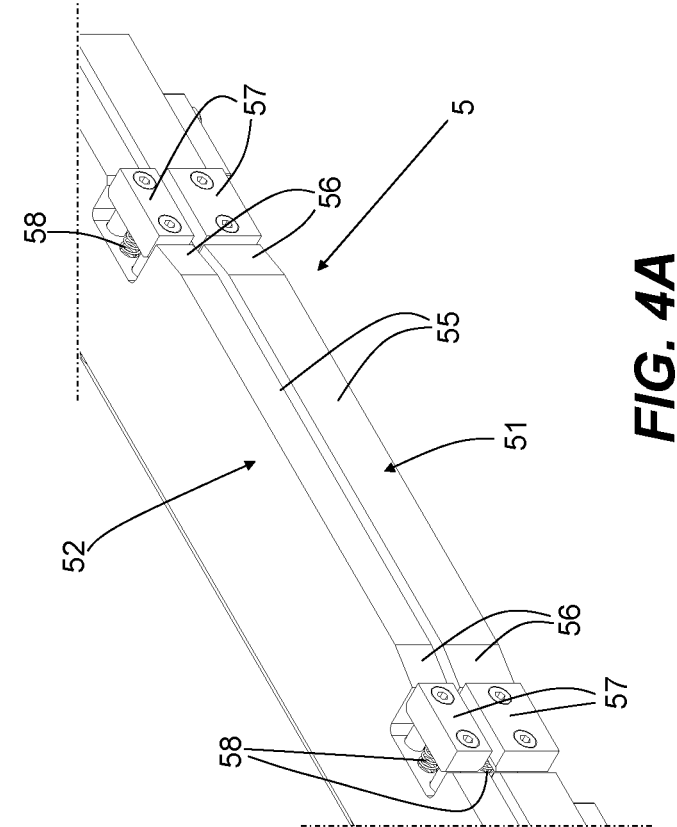
FIG. 4A is an enlarged view of a part of the second gripping device of FIG. 4.

The first gripping device 4 (in particular its plate elements 41, 42) has a face that is facing the first side 231 of the interspace 23, that is to say, facing the second gripping device 5. That face, projected in the plane of the positioned film 95, has a concave profile that comprises a central region 45 and two lateral wings 46 which project towards the first side 231 relative to the central region 45. Specifically, the projecting inserts 43 are located at the projecting lateral wings 46 (FIG. 3A), therefore, the first gripping device 4 is suitable for retaining the film 95 only at the corners of the film 95.

In the embodiment illustrated, the first gripping device 4 is mounted on the second jaw member 22, in a stationary position and projecting into the interspace 23. The first jaw member 21 has a corresponding seat that, when the jaw members 21, 22 are in the second, closed condition, receives part of the first gripping device 4. Moreover, in that second, closed condition, the central region 45 of the concave profile is downstream of and substantially aligned with (that is, substantially flush with) the perimetric edge of the container positioned in the seat 20 closest to the second end 232 of the interspace 23.

Whilst, as already indicated, the first gripping device 4 is stationary, in contrast the second gripping device 5 is mounted on a carriage 50 movable parallel to the longitudinal line 200. A motor device, not shown in detail in the figures, is designed to move the movable carriage 50 along said line, in both directions.

In the embodiment illustrated, the second gripping device 5 comprises a first plate element 51 and a second plate element 52, that are movable one relative to the other in a first direction for clamping the film 95 between them and in a second direction for releasing the film 95. In practice, the plate elements 51, 52 form a jaw.

Similarly to what was described for the first gripping device 4, the plate elements 51, 52 extend in the plane of the positioned film (in particular, in a horizontal plane) and are movable perpendicularly to said plane. Specifically, the first plate element 51 is a lower element and is moved by an actuating device relative to the second plate element 52 which is an upper element and is fixed to a structure of the movable carriage 50. Contact with the film 95 occurs at projecting inserts 53 (for example made of rubber or another elastic material) that are mounted on one of the plate elements and project towards the other plate element.

The second gripping device 5 (in particular its plate elements 51, 52) has a face that is facing the second side 232 of the interspace 23, that is to say, facing the first gripping device 4. That face, projected in the plane of the positioned film 95, has a convex profile that comprises a central region 55 that projects towards the second side 232 of the interspace 23 and two lateral regions 56 that are set back relative to the central region 55.

In practice, the concave profile of the first gripping device 4 is substantially shaped to match the convex profile of the second gripping device 5 and the two profiles almost make contact with each other when the second gripping device 5 is in the second position. In use, when the second gripping device 5 is in the second position, the two lateral wings 46 of the first gripping device 4 are capable of gripping at least corners of the film 95 that project from the two lateral regions 56 of the second gripping device 5 towards the first gripping device 4.

In particular, at the lateral regions 56 of the second gripping device 5, there are movable elements 57 that are movable parallel to the longitudinal line 200. Each of said movable elements 57 is equipped with a spring 58 (or another elastic element) that pushes the movable element 57 towards the second side 232 of the interspace 23 (that is to say, towards the first gripping device 4) and that is loaded when the movable element 57 is shifted in the opposite direction towards the first side 231 of the interspace 23.

Figure 8:
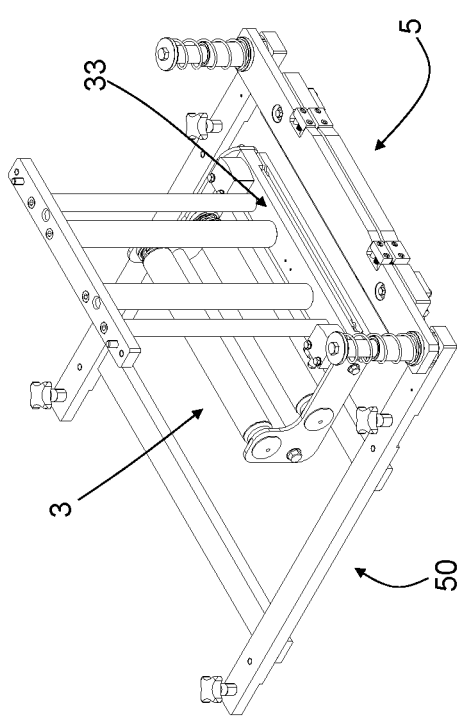
FIG. 8 shows a relative position of the first gripping device of FIG. 3 and of the second gripping device of FIG. 4.

During the movement towards the second position, near the second position, the movable elements 57 of the second gripping device 5 make contact with the lateral wings 46 of the first gripping device 4 (FIG. 8).

A further shifting moves the second gripping device 5 into the second position, substantially against the first gripping device 4 (FIG. 9): each movable element 57 is shifted towards the first side 231 by the lateral wings 46 of the first gripping device 4. In other words, the movable elements 57 project from the convex profile of the second gripping device 5 and therefore are pushed by the concave profile of the first gripping device 4 when the two devices 4, 5 make contact with each other.

The movable elements 57 are useful for preventing the film 95 from being able to curl or fold at the corners. In fact, the width of the film 95 is such that, when the film 95 is gripped by the second gripping device 5, the corners of the film 95 are at the movable elements 57, which protect the corners. Moreover, as is explained in more detail below, the edge of the film 95 is substantially aligned with (flush with) the central region 55 of the face of the second gripping device 5.

The shifting of the movable elements 57 caused by the lateral wings 46 allows the first gripping device 4 to grip the film 95 at the corners. In other words, the movable elements 57 act as a guide for correct insertion of the film 95 in the first gripping device 4, during the transfer of the film from the second gripping device 5 to the first gripping device 4.

The movable elements 57 are at distance from the plane (also defined by the projecting inserts 53) in which, in use, the film 95 gripped by the second gripping device 5 is located. Therefore, the movable elements 57 are shiftable without interfering with the film 95: when the second gripping device 5 reaches its position against the first gripping device 4, the film 95 remains in position and the shifting of the movable elements 57 frees its corners.

In particular, each plate element 51, 52 of the second gripping device 5 is provided with two of said movable elements 57, which are positioned at the sides of the respective central region 55. Similarly, each plate element 41, 42 of the first gripping device 4 is provided with two lateral wings 46.

Figure 7:
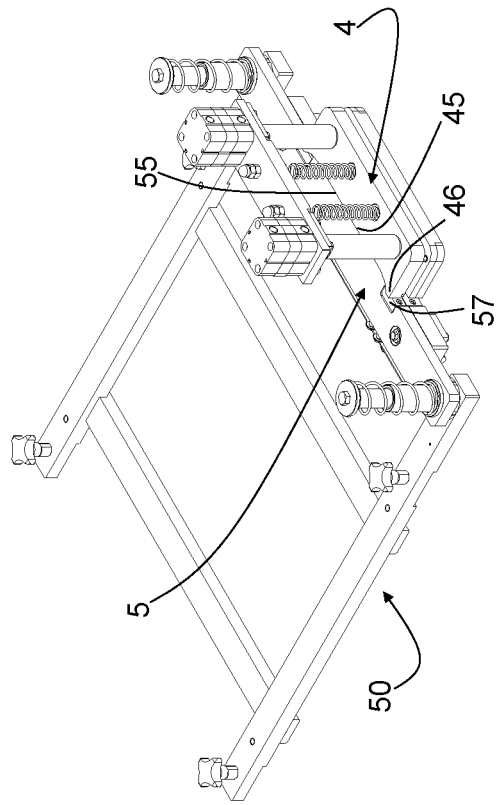
FIG. 7 shows another relative position of the second gripping device of FIG. 4 and of the third gripping device of FIG. 5.

In one embodiment, in order to ensure that the film 95 positioned in the interspace 23 is taut, the second gripping device 5 is further movable between the first position (FIG. 6) and a third position (FIG. 7) that is interposed between the first position and the film feeding device 3. In practice, during the return stroke the second gripping device 5 can go beyond the first position. The second gripping device 5 is open during the return stroke between the second position and the first position, so that it does not pull the already positioned film 95 backwards. When it reaches the first position, the second gripping device 5 is closed so that it grips the film 95. Therefore, the movement of the second gripping device 5 towards the third position (which is a movement along a short stretch, for example a few millimetres) pulls the film 95 backwards by a corresponding stretch and thus pulls taut the positioned film 95, whose other end is retained by the first gripping device 4.

After film sealing and cutting, as described below, before positioning the film 95 again the second gripping device 5 returns to the first position, recovering the stretch travelled towards the third position. Therefore, in order to grip the edge of the film 95 projecting from the film feeding device 3 before pulling the film 95 into the interspace 23, the second gripping device 5 in the third position opens to release the film 95 and return to the first position, where it closes.

As regards cutting of the film 95 after sealing, the film cutting system is capable of cutting the film 95 along a cutting line positioned between the film feeding device 3 and the seat 20 closest to the first side 231 of the interspace 23. In particular, the second gripping device 5 in the first position is aligned with (flush with) that cutting line.

In practice, with the second gripping device 5 in the first position after cutting, the edge of the cut film is aligned with (flush with) the central region 55 of the face of the second gripping device 5. Moreover, when the second gripping device 5 is in the first position, the central region 55 is upstream of and substantially aligned with (flush with) the perimetric edge of the container positioned in the seat 20 closest to the first end 231 of the interspace 23.

As already indicated, the film feeding device 3 comprises a device 33, that in particular is a third gripping device, for releasably retain the film 95. The second gripping device 5 in the first position is therefore capable of gripping one edge of the film 95 which projects from the third gripping device 33.

As with the other gripping devices 4, 5, the third gripping device 33 also comprises a first plate element 331 and a second plate element 332, that are movable one relative to the other in a first direction for clamping the film 95 between them and in a second direction for releasing the film 95. In practice, the plate elements 331, 332 form a jaw.

The plate elements 331, 332 extend in the plane of the positioned film (in particular, in a horizontal plane) and are movable perpendicularly to said plane. The first plate element 331 is a lower element and is moved by an actuating device relative to the second plate element 332 which is an upper element and is fixed to a structure of the film feeding device 3. For the third gripping device 33 too, contact with the film 95 occurs at projecting inserts 333 (for example made of rubber or another elastic material) that are mounted on one of the plate elements and project towards the other plate element.

Coordination between the open and closed positions of the gripping devices 4, 5, 33 will be more apparent below, in the description of machine 1 operation with reference to FIGS. 10 to 26.

FIG. 10. The two jaw members 21, 22 are in the first, open condition. The containers 91 are positioned in the seats 20. The film 95 has not yet been positioned in the interspace 23 and projects from the third gripping device 33. The first gripping device 4 is open, whilst the second gripping device 5 is in the first position (as in FIG. 6) and is closed, clamping the edge of the film 95. The third gripping device 33 is open and therefore allows the film 95 to be pulled into the interspace 23.

FIG. 11. The second gripping device 5 is shifted towards the second position, towards the first gripping device 4 (as in FIG. 8). The film 95, pulled by the second gripping device 5, extends in the interspace 23 between the containers 91 and the second jaw member 22.

FIG. 12. The second gripping device 5 is in the second position, against the first gripping device 4 (as in FIG. 9). The movable elements 57 of the second gripping device 5 are moved back and the lateral wings 46 of the first gripping device 4 are at the corners of the edge of the film 95.

FIG. 13. The first gripping device 4 is closed and retains the film 95, the second gripping device 5 is open. In practice, the job of retaining the film 95 has been transferred from the second gripping device 5 to the first gripping device 4.

Figure 14:
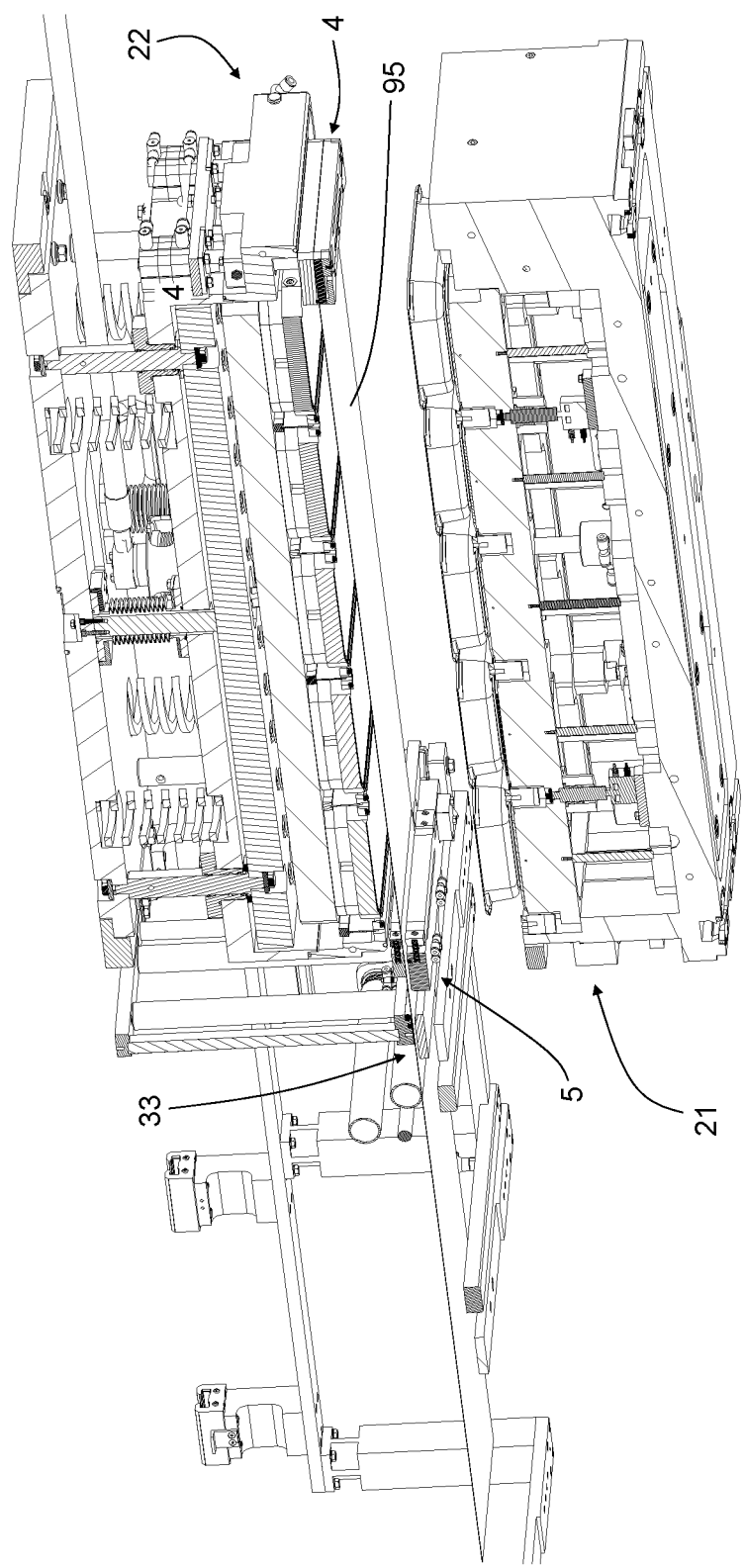

FIG. 14. The second gripping device 5 has returned to the first position (as in FIG. 6) and is still open. The first gripping device 4 has remained closed. The third gripping device 33 is open.

Figure 15:
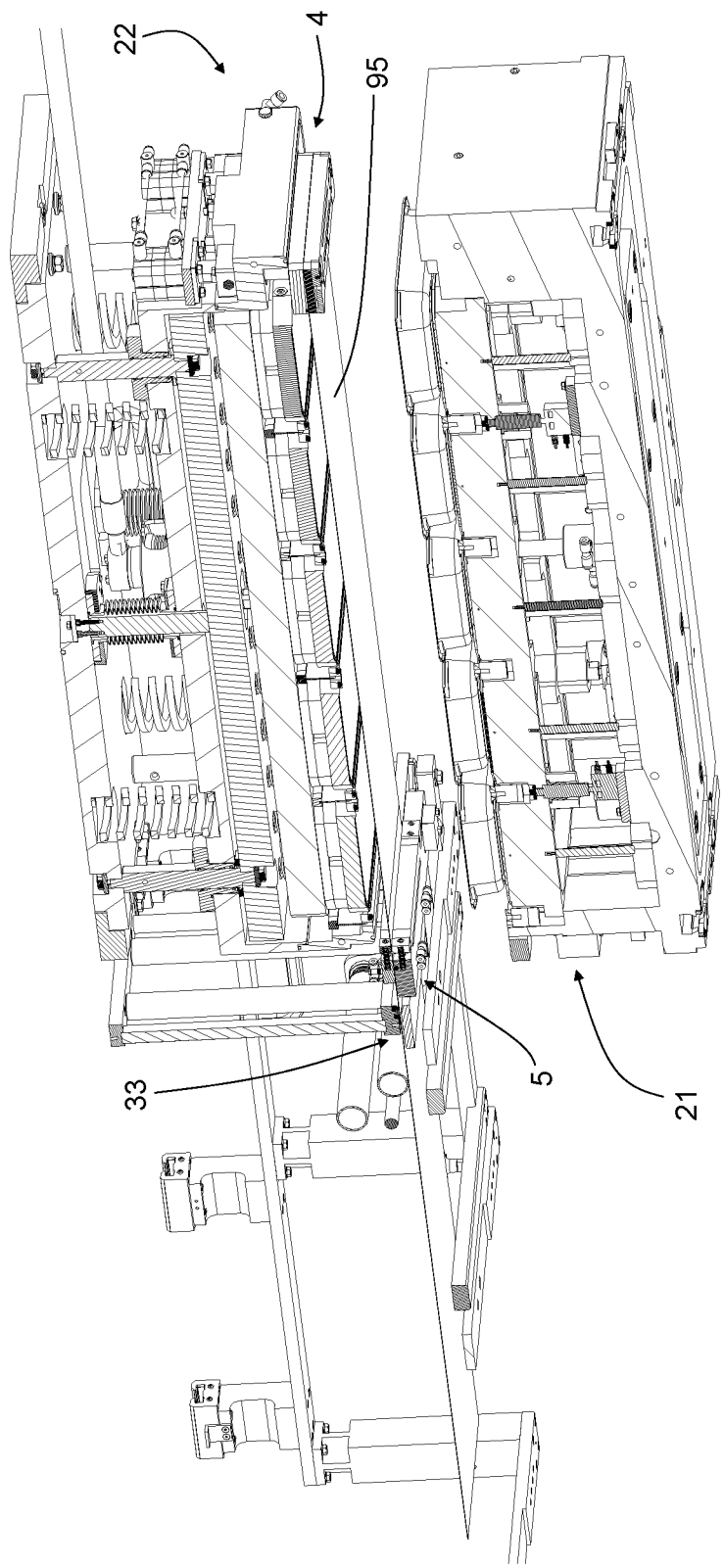

FIG. 15. After having closed, the second gripping device 5 is moved back into the third position (towards the third gripping device 33, by shifting several millimetres, as in FIG. 7) pulling with it the film 95 whose other end is retained by the closed first gripping device 4. Thanks to this, the film 95 has been pulled taut in the interspace 23.

Figure 16:
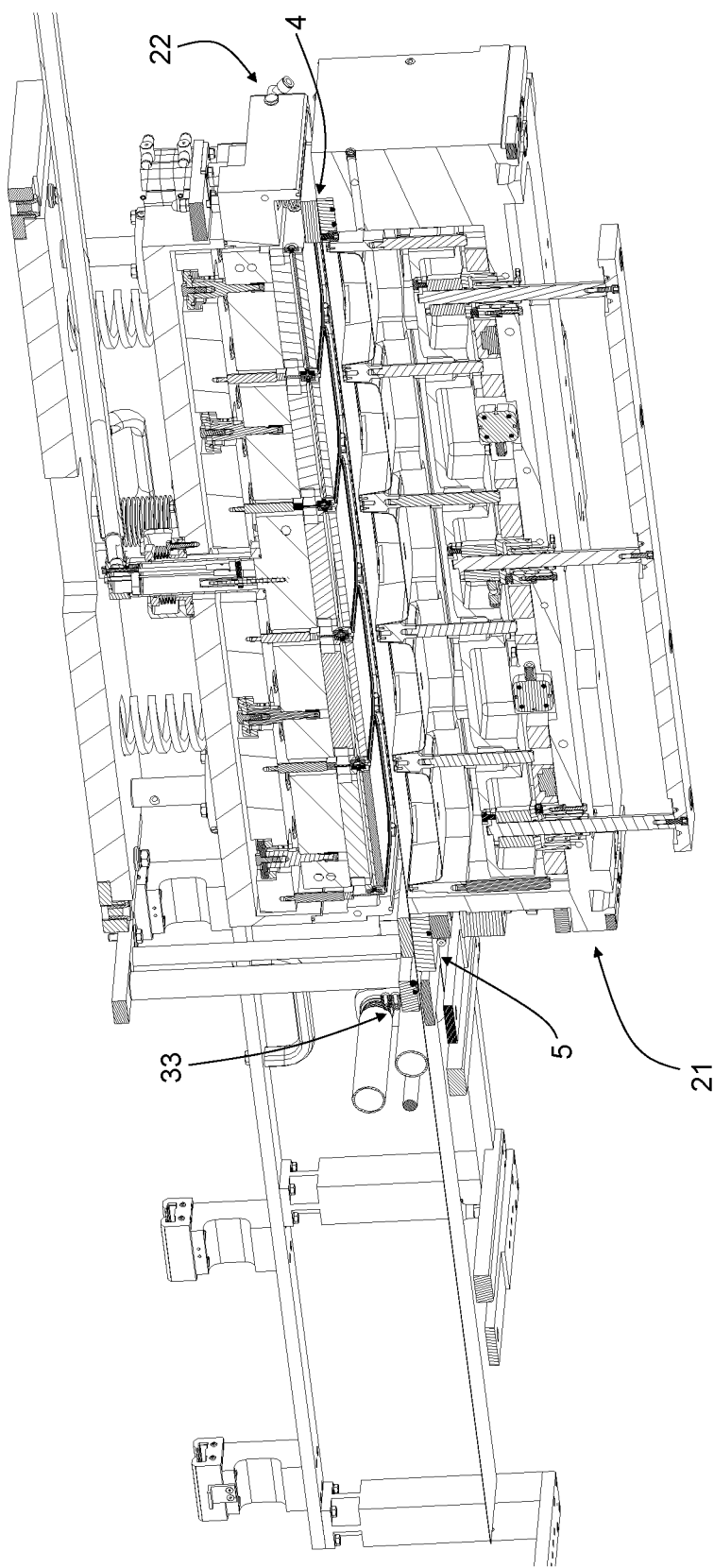

FIG. 16. The first jaw member 21 is shifted towards the second jaw member 22 and rests on the gripping devices 4, 5.

Figure 17:
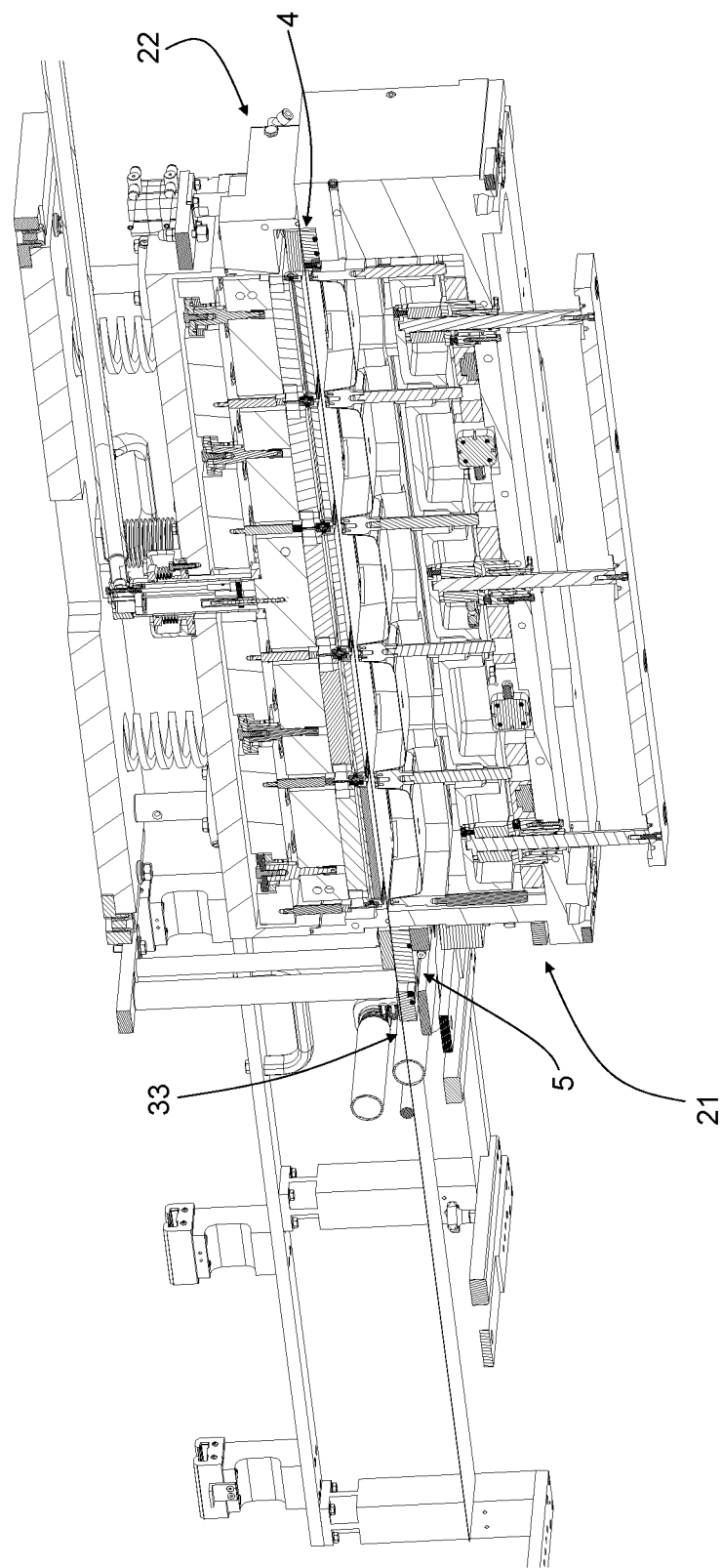

FIG. 17. At the end of the upward shifting of the first jaw member 21, the gripping devices 4, 5 and the film 95 are in contact with the bottom of the second jaw member 22. Therefore, the first gripping device 4 and the second gripping device 5 are contained between the first jaw member 21 and the second jaw member 22. The space between the jaw members 21, 22 is hermetically sealed. The air is removed from the containers 91 and gas (for creating a protective atmosphere) is injected into them.

FIG. 18. The container-holding plate 210 of the first jaw member 21 is raised towards the second jaw member 22. The containers 91 are brought into contact with the film 95.

FIG. 19. The locking plate 217 is shifted into position for locking the container-holding plate 210 in the raised position. Thanks to the locking unit 217, the columns of the container-holding plate 210 rest directly on the locking plate 217.

FIG. 20. The film 95 is sealed on the perimetric edges of the containers 91. For this purpose, the sealing system is operated and the heater 250 supplies the sealing plates 25 with the thermal energy necessary for heat sealing of the film 95.

FIG. 21. At the end of sealing, the cutting system is operated and the blades 26 cut the film 95 between one container and another. Moreover, a blade 26 cuts the film aligned with (flush with) the perimetric edge of the first container 91 near the first side 231 and near the second gripping device 5, when the latter is in the first position. The containers 91 are sealed and are free relative to the film 95 remaining in the film feeding device 3.

FIG. 22. The first gripping device 4 opens.

FIG. 23. The first jaw member 21 is lowered, taking the sealed containers 91 downwards with it.

FIG. 24. The second gripping device 5 opens, whilst the third gripping device 33 closes. Therefore, a stretch of film 95 is retained by the third gripping device 33 and projects as far as the first position of the second gripping device 5.

FIG. 25. The second gripping device 5 shifts from the third position (as in FIG. 7) to the first position (as in FIG. 6), recovering the film 95 tensioning stroke of the step of FIG. 15. Therefore, the second gripping device 5 is positioned aligned with (flush with) the cut edge of the film.

FIG. 26. The second gripping device 5 closes, whilst the third gripping device 33 opens. The sealed containers 91 can be removed and other containers 91 to be sealed can be placed in the seats 20, returning to the starting condition of FIG. 10.

From the above description it is apparent that the machine 1 allows the containers 91 to be sealed while minimising film 95 waste. In fact, during each sealing procedure the entire film 95 that is positioned in the interspace 23 by the movement of the second gripping device 5 is used for sealing the containers 91: the edge of the film is brought as far as the first gripping device 4 at the perimetric edge of the last container, thereby avoiding the need to cut the film at the first gripping device 4. The containers 91 in the seats 20 are near each other, therefore, a single cut between each container and the next is sufficient, without producing film waste.

The subject-matter of this disclosure may be modified and adapted in several ways without thereby departing from the scope of the inventive concept as defined in the claims.

All details may be substituted with other technically equivalent elements and the materials used, as well as the shapes and dimensions of the various components, may vary according to requirements.

The invention claimed is:

1. A machine (1) for sealing containers (91) using a film (95), comprising:
   a supporting framework (10);
   a first jaw member (21) comprising a plurality of seats (20) for receiving respective containers (91) to be sealed;
   a second jaw member (22) facing towards the seats (20) of said plurality of seats (20), the first jaw member (21) and the second jaw member (22) being movable one relative to the other between a first condition, in which the first jaw member (21) and the second jaw member (22) are separated from each other by an interspace (23) suitable for receiving the film (95), and a second condition, in which the first jaw member (21) and the second jaw member (22) are clamped together and, in use, press the film (95) against the containers (91) in the seats (20);
   a film feeding device (3);
   a positioning apparatus capable of positioning the film (95) in the interspace (23) between the first jaw member (21) and the second jaw member (22), the positioning apparatus comprising a first gripping device (4) and a second gripping device (5), each of the first gripping device and the second gripping device being closable to grip the film and openable to release the film;
   a sealing system which is associated with the first jaw member (21) or with the second jaw member (22) and is capable of sealing the film (95) on the containers (91) in the seats (20) when the first jaw member (21) and the second jaw member (22) are in the second condition, obtaining sealed containers; and
   a film cutting system;
   wherein the interspace (23) has a first side (231) and a second side (232), the film feeding device (3) facing towards the first side (231) of the interspace (23) and the first gripping device (4) of the positioning apparatus being positioned at the second side (232) of the interspace (23),
   a longitudinal line (200) extending between the first side (231) and the second side (232) of the interspace (23);
   the seats (20) being side by side and being one after another along the longitudinal line (200), a first seat of said plurality of seats (20) being the closest to the first side (231) of the interspace (23) and a last seat of said plurality of seats (20) being the closest to the second side (232) of the interspace (23);
   the film cutting system being capable of cutting the film (95) at least along a cutting line positioned between the film feeding device (3) and the first seat (20) closest to the first side (231) of the interspace (23);
   the second gripping device (5) of the positioning apparatus being movable parallel to the longitudinal line (200) with a movement between a first position and a second position, the movement of the second gripping device (5) being between the film feeding device (3) and the first gripping device (4);
   the second gripping device (5) in the first position being capable of gripping an edge portion of the film (95) which projects from the film feeding device (3); the second gripping device (5) in the first position extending from a first longitudinal edge of the film (95) to a second longitudinal edge of the film (95) which is opposite said first longitudinal edge;
   the second gripping device (5) being capable of pulling the film (95), when gripped by the second gripping device (5), by the movement towards the second position, thereby positioning the film (95) in the interspace (23) at said plurality of seats (20);
   the first gripping device (4) being capable of gripping an edge portion of the film (95) positioned in the interspace (23), when the second gripping device (5) is in the second position, the second gripping device (5) being capable of releasing the film (95) and returning to the first position by a return stroke; the second gripping device (5) having a first face that faces towards the second side (232) of the interspace (23), whereby, in use, when the second gripping device (5) is in the second position, a portion of the film (95) which is extending from or adjacent to said first face can be gripped by the first gripping device (4).

2. The machine (1) according to claim 1, wherein the second gripping device (5) is movable between the first position and a third position that is interposed between the first position and the film feeding device (3), the second gripping device (5) being capable of going beyond the first position, to the third position, in the return stroke,
   wherein the machine (1) is configured to operate the second gripping device (5) such that: the second gripping device is open during the return stroke to the first position; when the first position is reached, the second gripping device is closed to grip the film (95) which is positioned between the first gripping device (4) and the film feeding device (3); the second gripping device (5) is moved towards the third position to pull the film (95) and make it taut.

3. The machine (1) according to claim 2, wherein the machine (1) is configured to operate the second gripping device (5) such that the second gripping device (5) in the third position is opened to release the film (95) and returns to the first position to grip one edge of the film (95) projecting from the film feeding device (3).

4. The machine (1) according to claim 1, wherein the film feeding device (3) comprises a third gripping device (33) that is capable of releasably retaining the film (95), the second gripping device (5) in the first position being capable of gripping one edge of the film (95) that projects from the third gripping device (33).

5. The machine (1) according to claim 1, wherein the first gripping device (4) has a face that faces towards the first side (231) of the interspace (23) and that, projected in a plane of the film (95) positioned in the interspace (23), has a concave profile, said concave profile comprising a central region (45) and two lateral wings (46) which project towards the first side (231) relative to the central region (45),
   wherein the first face of the second gripping device (5), projected in said plane, has a convex profile, said convex profile comprising a central region (55) that projects towards the second side (232) of the interspace (23) and two lateral regions (56) that are set back relative to the central region (55), whereby, in use, when the second gripping device (5) is in the second position the two lateral wings (46) of the first gripping device (4) are capable of gripping at least film (95) corners that project from the two lateral regions (56) of the second gripping device (5) towards the first gripping device (4).

6. The machine (1) according to claim 5, wherein, at said lateral regions (56), the second gripping device (5) comprises movable elements (57) that are movable parallel to the longitudinal line (200), each of said movable elements (57) being equipped with an elastic member or a spring (58) that pushes the respective movable element (57) towards the second side (232) of the interspace (23), each of said movable elements (57) being shifted towards the first side (231) of the interspace (23) by the lateral wings (46) of the first gripping device (4) when the second gripping device (5) is in the second position.

7. The machine (1) according to claim 6, wherein said movable elements (57) are at a distance from a plane in which, in use, the film (95) gripped by the second gripping device (5) is located, the movable elements (57) being shiftable without interfering with the film (95).

8. The machine (1) according to claim 1, wherein each of the first gripping device (4) and the second gripping device (5) comprises a first plate element (41, 51) and a second plate element (42, 52) that are movable one relative to the other in a first direction for clamping the film (95) between them and in a second direction for releasing the film (95), said plate elements (41, 42, 51, 52) extending in a plane of the film (95) positioned in the interspace (23) and being movable perpendicularly to said plane.

9. The machine (1) according to claim 6, wherein each of the first gripping device (4) and the second gripping device (5) comprises a first plate element (41, 51) and a second plate element (42, 52) that are movable one relative to the other in a first direction for clamping the film (95) between them and in a second direction for releasing the film (95), said plate elements (41, 42, 51, 52) extending in said plane and being movable perpendicularly to said plane, and wherein the first plate element (51) of the second gripping device (5) is equipped with two of said movable elements (57) and the second plate element (52) of the second gripping device (5) is equipped with two of said movable elements (57).

10. The machine (1) according to claim 1, wherein the cutting system is capable of cutting the film (95) along cutting lines, each of the cutting lines being between two side-by-side seats of said plurality of seats (20).

11. The machine (1) according to claim 1, wherein the first face of the second gripping device (5), projected in said plane, has a convex profile, said convex profile comprising a central region (55) that projects towards the second side (232) of the interspace (23) and two lateral regions (56) that are set back relative to the central region (55), wherein the second gripping device (5) in the first position is aligned with, and flush with, the cutting line between the film feeding device (3) and the first seat (20) that is closest to the first side (231) of the interspace (23), such that, after cutting, the edge of the cut film is flush with the central region of the face of the second gripping device in the first position.

12. The machine (1) according to claim 1, wherein the first gripping device (4) is mounted on the second jaw member (22), in a position projecting into the interspace (23).

13. The machine (1) according to claim 1, wherein the second gripping device (5) is mounted on a carriage (50) movable parallel to said longitudinal line (200).

14. The machine (1) according to claim 4, wherein the third gripping device (33) comprises a first plate element (331) and a second plate element (332) that are movable one relative to the other in a first direction for clamping the film (95) between them and in a second direction for releasing the film (95), said plate elements (331, 332) extending in a plane of the film (95) positioned in the interspace (23) and being movable perpendicularly to said plane.

15. The machine (1) according to claim 3, wherein the film feeding device (3) comprises a third gripping device (33) that is capable of releasably retaining the film (95), the second gripping device (5) in the first position being capable of gripping one edge of the film (95) that projects from the third gripping device (33), the machine (1) being configured so that the third gripping device (33) retains the film (95) while the second gripping device (5) returns from the third position to the first position.

16. The machine (1) according to claim 5, wherein the concave profile of the first gripping device (4) has a shape which substantially matches a shape of the convex profile of the second gripping device (5) and wherein the concave profile of the first gripping device makes contact with the convex profile of the second gripping device when the second gripping device (5) is in the second position.

17. The machine (1) according to claim 1, wherein the first gripping device (4) has a face that faces towards the first side (231) of the interspace (23) and that, projected in a plane of the film (95) positioned in the interspace (23), has a concave profile, said concave profile comprising a central region (45) and two lateral wings (46) which project towards the first side (231) relative to the central region (45), wherein the first face of the second gripping device (5), projected in said plane, has a convex profile, said convex profile comprising a central region (55) that projects towards the second side (232) of the interspace (23) and two lateral regions (56) that are set back relative to the central region (55), wherein the concave profile of the first gripping device (4) has a shape which substantially matches a shape of the convex profile of the second gripping device (5) and wherein the concave profile of the first gripping device makes contact with the convex profile of the second gripping device when the second gripping device (5) is in the second position, whereby, in use, when the second gripping device (5) is in the second position the two lateral wings (46) of the first gripping device (4) are capable of gripping at least film (95) corners that project from the two lateral regions (56) of the second gripping device (5) towards the first gripping device (4), wherein the second gripping device (5) in the first position is aligned with, and flush with, the cutting line between the film feeding device (3) and the first seat (20) that is closest to the first side (231) of the interspace (23), such that, after cutting, the edge of the cut film is flush with the central region of the face of the second gripping device in the first position, wherein the film feeding device (3) comprises a third gripping device (33) that is capable of releasably retaining the film (95), the second gripping device (5) in the first position being capable of gripping one edge of the film (95) that projects from the third gripping device (33).

18. The machine (1) according to claim 1, comprising a system for positioning the containers to be sealed into the seats of the first jaw member, when the first jaw member and the second jaw member are in the first condition, and comprising a system for picking up the sealed containers from the seats, after the first jaw member and the second jaw member have been moved from the second condition to the first condition.

\* \* \* \* \*

UNITED STATES PATENT AND TRADEMARK OFFICE
CERTIFICATE OF CORRECTION

PATENT NO. : 10,926,899 B2
APPLICATION NO. : 15/652468
DATED : February 23, 2021
INVENTOR(S) : Giovanni Mondini Page 1 of 1

It is certified that error appears in the above-identified patent and that said Letters Patent is hereby corrected as shown below:

On the Title Page

Under (30), Foreign Application Priority Data, please delete "UA2016A005395" and insert therefor
-- 102016000076881 --

Signed and Sealed this
Twenty-fourth Day of August, 2021

Drew Hirshfeld
*Performing the Functions and Duties of the*
*Under Secretary of Commerce for Intellectual Property and*
*Director of the United States Patent and Trademark Office*